United States Patent
Yanagawa et al.

(10) Patent No.: US 11,134,670 B2
(45) Date of Patent: Oct. 5, 2021

(54) METHODS OF SUPPRESSING SETTLEMENT OF BARNACLES

(71) Applicants: THE CHUGOKU ELECTRIC POWER CO., INC., Hiroshima (JP); SESSILE RESEARCH CORPORATION, Hyogo (JP)

(72) Inventors: Toshiharu Yanagawa, Hiroshima (JP); Shinsuke Saito, Hyogo (JP); Keiji Yamashita, Hyogo (JP); Kyoko Kamiya, Hyogo (JP); Yoshio Hayashi, Hyogo (JP)

(73) Assignees: THE CHUGOKU ELECTRIC POWER CO., INC., Hiroshima (JP); SESSILE RESEARCH CORPORATION, Hyogo (JP)

( * ) Notice: Subject to any disclaimer, the term of this patent is extended or adjusted under 35 U.S.C. 154(b) by 0 days.

(21) Appl. No.: 15/512,633

(22) PCT Filed: Dec. 8, 2014

(86) PCT No.: PCT/JP2014/082448
§ 371 (c)(1),
(2) Date: Mar. 20, 2017

(87) PCT Pub. No.: WO2016/092619
PCT Pub. Date: Jun. 16, 2016

(65) Prior Publication Data
US 2017/0290326 A1    Oct. 12, 2017

(51) Int. Cl.
*A01M 29/10* (2011.01)
*B08B 17/02* (2006.01)
(Continued)

(52) U.S. Cl.
CPC ............ *A01M 29/10* (2013.01); *A01M 99/00* (2013.01); *B08B 17/02* (2013.01); *C02F 1/30* (2013.01); *E02B 1/00* (2013.01); *C02F 2103/08* (2013.01)

(58) Field of Classification Search
CPC ...... A01M 29/10; A01M 29/24; A01M 29/28; C02F 1/30; E02B 1/006
See application file for complete search history.

(56) References Cited

U.S. PATENT DOCUMENTS 4,235,043 A   11/1980  Harasawa et al.
4,336,223 A    6/1982  Hillman
(Continued)

FOREIGN PATENT DOCUMENTS

CN    106793769 A    5/2017
EP      2885968 A1   6/2015
(Continued)

OTHER PUBLICATIONS

English Translation of applicant submitted document Yanagawa (WO 2014/027402) dated Feb. 20, 2014.*
(Continued)

*Primary Examiner* — Monica L Barlow
*Assistant Examiner* — Aaron M Rodziwicz
(74) *Attorney, Agent, or Firm* — Clark & Elbing LLP

(57) ABSTRACT

The present invention provides a method of suppressing larvae of barnacles in the settlement stage from settling on a substrate in water by irradiating light comprising the spectrum of 409 to 412 nm and a part of 400 to 460 nm to larvae of barnacles in the settlement stage in a direction from the substrate to the larvae of barnacles in the settlement stage.

15 Claims, 29 Drawing Sheets

(51) Int. Cl.
  *C02F 1/30* (2006.01)
  *A01M 99/00* (2006.01)
  *E02B 1/00* (2006.01)
  *C02F 103/08* (2006.01)

(56) References Cited

U.S. PATENT DOCUMENTS

| | | | |
|---|---|---|---|
| 5,308,505 A * | 5/1994 | Titus | A61L 2/0011 |
| | | | 210/745 |
| 5,320,749 A * | 6/1994 | Mullen | A61L 2/10 |
| | | | 210/199 |
| 5,655,483 A * | 8/1997 | Lewis | A01M 19/00 |
| | | | 119/720 |
| 6,149,343 A * | 11/2000 | Lewis | A01M 21/046 |
| | | | 119/720 |
| 6,447,720 B1 | 9/2002 | Horton, III et al. | |
| 7,329,538 B2 | 2/2008 | Wainwright et al. | |
| 7,695,675 B2 | 4/2010 | Kaiser et al. | |
| 8,240,312 B2 | 8/2012 | Feuerstein et al. | |
| 2005/0147579 A1 | 7/2005 | Schneider et al. | |
| 2005/0232960 A1 | 10/2005 | Buccolini et al. | |
| 2008/0206095 A1 | 8/2008 | Duthie | |
| 2011/0226966 A1 | 9/2011 | Takahashi et al. | |
| 2012/0006995 A1 | 1/2012 | Greuel | |
| 2016/0143257 A1 | 5/2016 | Yanagawa et al. | |
| 2017/0164602 A1 | 6/2017 | Yanagawa et al. | |
| 2017/0172135 A1 | 6/2017 | Yanagawa et al. | |
| 2017/0290327 A1 | 10/2017 | Yanagawa et al. | |

FOREIGN PATENT DOCUMENTS

| | | |
|---|---|---|
| EP | 3124441 A1 | 2/2017 |
| JP | H05-228454 A | 9/1993 |
| JP | 6-218367 A | 8/1994 |
| JP | H06-218367 A | 8/1994 |
| JP | 07-037186 U | 7/1995 |
| JP | 7-265867 A | 10/1995 |
| JP | H07-265867 A | 10/1995 |
| JP | 8-164383 A | 6/1996 |
| JP | 8-164384 A | 6/1996 |
| JP | H08-164384 A | 6/1996 |
| JP | 11-37666 A | 2/1999 |
| JP | H11-037666 A | 2/1999 |
| JP | 11-196707 A | 7/1999 |
| JP | 11-278374 A | 10/1999 |
| JP | H11-278374 A | 10/1999 |
| JP | 2003-301435 A | 10/2003 |
| JP | 3605128 B2 | 12/2004 |
| JP | 2005-144212 A | 6/2005 |
| JP | 2005-144213 A | 6/2005 |
| JP | 2005-144214 A | 6/2005 |
| JP | 2010-187637 A | 9/2010 |
| JP | 05-228454 B2 | 7/2013 |
| JP | 5301314 B2 | 9/2013 |
| WO | WO-98/30230 A1 | 7/1998 |
| WO | WO-2014/027402 A1 | 2/2014 |
| WO | WO-2014/188347 A1 | 11/2014 |
| WO | WO-2015/145527 A1 | 10/2015 |

OTHER PUBLICATIONS

Extended European Search Report for European Patent Application No. 14907701.8, dated Oct. 2, 2017 (5 pages).
Notification of Reason for Rejection for Japanese Patent Application No. 2015-559345, dated Feb. 2, 2016 (4 pages) (English language translation provided).
International Search Report for International Application No. PCT/JP2014/082448, dated Mar. 10, 2015 (5 pages) (English language translation provided).
Written Opinion of the International Searching Authority for International Application No. PCT/JP2014/082448, dated Mar. 10, 2015 (9 pages) (English language translation provided).
International Preliminary Report on Patentability for International Application No. PCT/JP2014/082448, dated Jun. 13, 2017 (11 pages) (English language translation provided).
Notification of Reason for Refusal for Korean Patent Application No. 10-2017-7007814, dated Jun. 20, 2018 (13 pages) (machine generated English language translation provided).
Chemical Method. Marine Life Contamination Countermeasure Manual. Edited by the Japan Society of Electrochemical Society and Marine Organism Contamination Countermeasure, Gihodo Publishing, pp. 106-110 (1991) (English language machine translation provided) (6 pages).
Chlorine Injection. Handbook of Contamination Countermeasures for Power Plant Seawater Facilities. Edited by Thermal and Nuclear Power Engineering Society, Kousesha Kouseikaku Publishing, pp. 118-132 (2014) (English language machine translation provided) (17 pages).
Extended European Search Report for European Patent Application No. 15887495.8, dated Oct. 24, 2017 (9 pages).
First Office Action for Chinese Patent Application No. 201580052149.7 dated May 2, 2018 (English language translation provided) (10 pages).
International Preliminary Report on Patentability for International Application No. PCT/JP2015/059798, dated Oct. 3, 2017 (English language translation provided) (9 pages).
International Search Report for International Application No. PCT/JP2015/059798, dated Apr. 28, 2015 (English language translation provided) (3 pages).
Kawabe, Chlorine. Compendium of Measures Against Large Scale Adherence. Edited by the Japan Society of Electrochemical Society and Marine Organism Contamination Countermeasure, pp. 97-102 (1998) (English language machine translation provided) (8 pages).
Notification of Reason for Refusal for Korean Patent Application No. 10-2017-7008062, dated Jun. 20, 2018 (15 pages) (English language translation provided).
Notification of Reason for Rejection for Japanese Patent Application No. 2015-559343, dated Mar. 15, 2016 (English language translation provided) (4 pages).
Written Opinion of the International Searching Authority for International Application No. PCT/JP2015/059798, dated Apr. 28, 2015 (English language translation provided) (7 pages).
International Search Report for International Application No. PCT/JP2012/070700, dated Nov. 20, 2012 (2 pages).
International Preliminary Report on Patentability for International Application No. PCT/JP2012/070700, dated Feb. 17, 2015 (6 pages).
English language translation of the Written Opinion of the International Searching Authority for International Application No. PCT/JP2012/070700, dated Nov. 20, 2012 (5 pages).
Kobak, "Impact of light conditions on geotaxis behaviour of juvenile *Dreissena polymorpha*," Folia Malacologica. 10(2):77-82 (2002).
Second Office Action for Chinese Patent Application No. 201280075871.9, dated Aug. 30, 2016 (English language translation provided) (10 pages).
Communication pursuant to Article 94(3) EPC for European Patent Application No. 12891404.1, dated Nov. 4, 2016 (5 pages).
Notice of Final Rejection for Korean Patent Application No. 10-2015-7005863, dated Dec. 27, 2016 (7 pages) (English language translation provided).
Decision of Rejection for Chinese Patent Application No. 201280075871.9, dated Mar. 7, 2017 (8 pages) (English language translation provided).
Notification of Reexamination for Chinese Patent Application No. 201280075871.9, dated May 4, 2018 (English language translation provided) (8 pages).
"Mussel Culture Technology", edited and translated by Liu Anni, Wuzhou Publishing House, East Asian Book Company, p. 24, Sep. 1987 (English language translation provided) (3 pages).
"Mussel culture" edited by the Shandong Aquatic School Mariculture Research and Research Group, Agricultural Press, 1st Edition, pp. 49-51, Nov. 1978 (English language translation provided) (6 pages).
Zhang Fuzhen, "Observation of the habits of larvae and seedlings of purple mussels", Journal of Zoology, No. 3, pp. 129-130, 1963 (English language translation provided) (6 pages).

(56) References Cited

OTHER PUBLICATIONS

Notification of Reason for Rejection for Japanese Patent Application No. 2015-559347, dated Feb. 9, 2016 (English language translation provided) (4 pages).
Decision of Rejection for Japanese Patent Application No. 2015-559347, dated May 10, 2016 (English language translation provided) (3 pages).
Extended European Search Report for European Patent Application No. 14886901.9, dated Feb. 21, 2017 (7 pages).
International Search Report for International Application No. PCT/JP2014/058009, dated May 20, 2014 (English language translation provided) (5 pages).
Written Opinion of the International Search Authority for International Application No. PCT/JP2014/058009, dated May 20, 2014 (English language translation provided) (9 pages).
International Preliminary Report on Patentability for International Application No. PCT/JP2014/058009, dated Sep. 27, 2016 (English language translation provided) (11 pages).
Notification of Reason for Rejection for Japanese Patent Application No. 2015-559346, dated Feb. 9, 2016 (English language translation provided) (4 pages).
Decision of Rejection for Japanese Patent Application No. 2015-559346, dated May 10, 2016 (English language translation provided) (3 pages).
Extended European Search Report for European Patent Application No. 14886734.4, dated Feb. 21, 2017 (7 pages).
International Search Report for International Application No. PCT/JP2014/058010, dated May 20, 2014 (English language translation provided) (5 pages).
Written Opinion of the International Search Authority for International Application No. PCT/JP2014/058010, dated May 20, 2014 (English language translation provided) (7 pages).
International Preliminary Report on Patentability for International Application No. PCT/JP2014/058010, dated Sep. 27, 2016 (English language translation provided) (9 pages).

\* cited by examiner

FIG. 2A

| LARVAE | LANES | | | | | | | | | | | | | | | | | | | | | | | |
|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |

PROJECTION LIGHT (PEAK WAVELENGTH: 562 – 582 nm)
IRRADIANCE: 100 W m$^{-2}$

FIG. 2B

| LARVAE | LANES | | | | | | | | | | | | | | | | | | | | | | | |
|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| No.31 | ●← | | | | | | | | | | | | | | | | | | | | | | | |
| No.32 | ●← | | | | | | | | | | | | | | | | | | | | | | | |
| No.33 | ●← | | | | | | | | | | | | | | | | | | | | | | | |
| No.34 | ●← | | | | | | | | | | | | | | | | | | | | | | | |
| No.35 | ●← | | | | | | | | | | | | | | | | | | | | | | | |
| No.36 | ●← | | | | | | | | | | | ① | | | | | | | | | | | | |
| No.37 | ●← | | | | | | | ① | | | | | | | | | | | | | | | | |
| No.38 | ●← | | | | | | | | | | | | | | | | | | | | | | | |
| No.39 | ●← | | | | | ② | | ① | | | | | | | | | | | | | | | | |
| No.40 | ●← | | | | | | | | | | | | | | | | | | | | | | | |
| No.41 | ●← | | | | | | | | | | | | | | | | | | | | | | | |
| No.42 | ●← | | | | | | | | | | | | | | | | | | | | | | | |
| No.43 | ●← | | | | | | | | | | | | | | | | | | | | | | | |
| No.44 | ●← | | | | | | | | | | | | | | | | | | | | | | | |
| No.45 | ●← | | | | | | | | | | | | | | | | | | | | | | | |
| No.46 | ●← | | | | | | | | | | | | | | | | | | | | | | | |
| No.47 | ●← | | | | | | | | | | | | | | | | | | | | | | | |
| No.48 | ●← | | | | | | | | | | | | | | | | | | | | | | | |
| No.49 | ●← | | | | | | | | | | | | | | | | | | | | | | | |
| No.50 | ●← | | | | | | | | | | | | | | | | | | | | | | | |

LED SPECTRUM: 515 – 535 nm
IRRADIANCE: 100 W m$^{-2}$

FIG. 2C

| LARVAE | LED SPECTRUM: 460 – 480 nm ||||||||||||||||||||||||
|---|---|---|---|---|---|---|---|---|---|---|---|---|---|---|---|---|---|---|---|---|---|---|---|---|
| | IRRADIANCE: 100 W m$^{-2}$ ||||||||||||||||||||||||
| | LANES ||||||||||||||||||||||||
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| No.51 | ● | | | | | | | | | | | | | | | | | | | | | | | |
| No.52 | ● | | | | | | | | | | | | | | | | | | | | | | | |
| No.53 | ● | | | | | | | | | | | | | | | | | | | | | | | |
| No.54 | ● | | | | | ② | ① | | | | | | | | | | | | | | | | | |
| No.55 | ● | | | | | | | | | | | | | | | | | | | | | | | |
| No.56 | ● | | | | | | | | | | | | | | | | | | | | | | | |
| No.57 | ● | | | | | | | | | | | | | | | | | | | | | | | |
| No.58 | ● | | | | | | | | | | | | | | | | | | | | | | | |
| No.59 | ● | | | | | | | | | | ① | | | | | | | | | | | | | |
| No.60 | ● | | | | | | | | | | | | | | | | | | | | | | | |
| No.61 | ● | | | | | | | | | | | | | | | | | | | | | | | |
| No.62 | ● | | | | | | | | | | | | | | | | | | | | | | | |
| No.63 | ● | | | | | | | ② | | | ① | | | | | | | | | | | | | |
| No.64 | ● | | | | | | | | | | | | | | | | | | | | | | | |
| No.65 | ● | | | | | | | | | | | | | | | | | | | | | | | |
| No.66 | ● | | | | | | | | | | | | | | | | | | | | | | | |
| No.67 | ● | | | | | | | | | | | | | | | | | | | | | | | |
| No.68 | ● | | | | | | | | | | | | | | | | | | | | | | | |
| No.69 | ● | | | | | | | | | | | | | | | | | | | | | | | |
| No.70 | ● | | | | | | | | | | | | | | | | | | | | | | | |

FIG. 2D

| LARVAE | LED SPECTRUM: 440 – 460 nm ||||||||||||||||||||||||
|---|---|---|---|---|---|---|---|---|---|---|---|---|---|---|---|---|---|---|---|---|---|---|---|---|
| | IRRADIANCE: 100 W m$^{-2}$ ||||||||||||||||||||||||
| | LANES ||||||||||||||||||||||||
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| No.71 | ●← | | | | | | | | | | | | | | | | | | | | | | | |
| No.72 | ●← | | | | | | | ① | | | | | | | | | | | | | | | | |
| No.73 | ●← | | | | | | | | | | ① | | | | | | | | | | | | | |
| No.74 | ●← | | | | | | | | | | | | | | | | | | | | | | | |
| No.75 | ●← | | | | | | | | | | | | | | | | | | | | | | | |
| No.76 | ●← | | | | | | | | | | | | | | | | | | | | | | | |
| No.77 | ●← | | | | | | | | | | | | | | | | | | | | | | | |
| No.78 | ●← | | | | | | | ③ | | ① | ② | | | | | | | | | | | | | |
| No.79 | ●← | | | | | | | | | | | | | | | | | | | | | | | |
| No.80 | ①→● | | | | | | | | | | | | | | | | | | | | | | | |
| No.81 | ●← | | | | | | | | | | | | | | | | | | | | | | | |
| No.82 | ●← | | | | | | | | ① | | | | | | | | | | | | | | | |
| No.83 | ●← | | | | | | | | | | | | | | | | | | | | | | | |
| No.84 | ●← | | | | | | | | | | | | | | | | | | | | | | | |
| No.85 | ●← | | | | | | | | | | | | | | | | | | | | | | | |
| No.86 | ●← | | | | | | | | | | | | | | | | | | | | | | | |
| No.87 | ●← | | | | | | | | | | | | | | | | | | | | | | | |
| No.88 | ●← | | | | | | | | | | | | | | | | | | | | | | | |
| No.89 | ●← | | | | | | | | | | | | | | | | | | | | | | | |
| No.90 | ●← | | | | | | | | | | | | | | | | | | | | | | | |

FIG. 2E

| LARVAE | LED SPECTRUM: 409 – 412 nm ||||||||||||||||||||||||
|---|---|---|---|---|---|---|---|---|---|---|---|---|---|---|---|---|---|---|---|---|---|---|---|
| | IRRADIANCE: 100 W m$^{-2}$ ||||||||||||||||||||||||
| | LANES ||||||||||||||||||||||||
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| No.91 | ③● | | ④ | | ② | | | | ① | | | | | | | | | | | | | | | |
| No.92 | ● | | | | | | ① | | | | | | | | | | | | | | | | | |
| No.93 | ● | | | | | | | | | | | | | | | | | | | | | | | |
| No.94 | | | | | ●② ④ | | ③ | | | | ① | | | | | | | | | | | | | |
| No.95 | ● | | | | | | | | | | | | | | | | | | | | | | | |
| No.96 | ● | | | | | ① | | | | | | | | | | | | | | | | | | |
| No.97 | | | | | | | | ①● | | | | | | | | | | | | | | | | |
| No.98 | ①③ ● ② | | ④ | | | | | | | | | | | | | | | | | | | | | |
| No.99 | ● | | | | | | | | | | | | | | | | | | | | | | | |
| No.100 | | | | | | | | | | | | | | ① | | ② | | | | ③ | | ④ | | ● |
| No.101 | ● | | | | | | | | | | | | | | | | | | | | | | | |
| No.102 | ● | | | | | | | | | | | | | | | | | | | | | | | |
| No.103 | ① | | | | ②● | | | | | | | | | | | | | | | | | | | |
| No.104 | ● | | | | | | | | | | | | | | | | | | | | | | | |
| No.105 | ① | | | ② | | | | ③● | | | | | | | | | | | | | | | | |
| No.106 | ● | | | | | | | | | | | | | | | | | | | | | | | |
| No.107 | ①② | | ③ | | ● | | | | | | | | | | | | | | | | | | | |
| No.108 | | | | ① | | ② | | ③ | | | | | | | | | ● | | | | | | | |
| No.109 | ① | | | | | | ② | | ③ | | ● | | | | | | | | | | | | | |
| No.110 | ● | | | | | | | | | | | | | | | | | | | | | | | |

FIG. 2F

| LARVAE | \multicolumn{24}{c}{LED SPECTRUM: 409 – 412 nm} |
|---|---|

| | \multicolumn{24}{c}{IRRADIANCE: 125 W m$^{-2}$} |

| LARVAE | \multicolumn{24}{c}{LANES} |
|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| No.111 | ● | | | | | | | | | | | | | | | | | | | | | | | |
| No.112 | ● | | | | | | | | | | | | | | | | | | | | | | | |
| No.113 | ● | | | | | | | | | | | | | | | | | | | | | | | |
| No.114 | ● | | ② | ① | | | | | | | | | | | | | | | | | | | | |
| No.115 | ● | | | | | | ① | | | | | | | | | | | | | | | | | |
| No.116 | ● | | | | | | | | | | | | | | | | | | | | | | | |
| No.117 | ①● | | ② | | | | | | | | | | | | | | | | | | | | | |
| No.118 | ● | | | | | | | | | | | | | | | | | | | | | | | |
| No.119 | ● | | | | | | | | | | | | | | | | | | | | | | | |
| No.120 | ● | | | | | | | | | | | | | | | | | | | | | | | |
| No.121 | ● | | | | | | | | | | | | | | | | | | | | | | | |
| No.122 | ● | | | | | | | | | | | | | | | | | | | | | | | |
| No.123 | ● | | | | | | | | | | | | | | | | | | | | | | | |
| No.124 | ① | | | | ② | | | ③ | | | | | | | ● | | | | | | | | | |
| No.125 | ① | | | | | ② | | ● | | | | | | | | | | | | | | | | |
| No.126 | | | | | | | | ①● | | | | | | | | | | | | | | | | |
| No.127 | ● | | | | | | | | | | | | | | | | | | | | | | | |
| No.128 | ①③ | | ② | ④ | ⑤ | | | | | | ⑥ | | | ⑦ | ● | | | | | | | | | |
| No.129 | ● | | | | | | | | | | | | | | | | | | | | | | | |
| No.130 | ● | | | | | | | | | | | | | | | | | | | | | | | |
| No.131 | ● | | | | | | | | | | | | | | | | | | | | | | | |
| No.132 | ① | | ● | | ② | | ③ | | | | | | | | | | | | | | | | | |
| No.133 | ① | | | | | | ② | ● | | | | | | | | | | | | | | | | |
| No.134 | ① | | ② | ● | | | | | | | | | | | | | | | | | | | | |
| No.135 | ● | | | | | | | | | | | | | | | | | | | | | | | |
| No.136 | | | | | | | | | ① | | ② | | ③ | | | | ④ | ● | | | | | | |
| No.137 | ① | | | ● | | | | | | | | | | | | | | | | | | | | |
| No.138 | ① | | ● | | | | | | | | | | | | | | | | | | | | | |
| No.139 | ①● | | | | | | | | | | | | | | | | | | | | | | | |
| No.140 | ① | | | | | | ● | | | | | | | | | | | | | | | | | |

FIG. 2G

| LARVAE | \multicolumn{24}{c|}{LED SPECTRUM: 370 – 380 nm, IRRADIANCE: 20 W m$^{-2}$, LANES} |
|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| No.141 | ① | | ② | | ③ | | | ④ | | ● | | | | | | | | | | | | | | |
| No.142 | ● | | | | | | | | | | | | | | | | | | | | | | | |
| No.143 | ● | | | | | | | | | | | | | | | | | | | | | | | |
| No.144 | ① | | | | ② | | | ③ | | | | | | | | | ④ | | | | | | | ● |
| No.145 | ● | | | | | | | | | | | | | | | | | | | | | | | |
| No.146 | ①● | | | | ② | ④ | | ③ | | | | | | | | | | | | | | | | |
| No.147 | | | ③ | | ④ | | | ②⑤ | | | ① | | | | | | | | | | | | | ● |
| No.148 | ● | | | | | | | | | | | | | | | | | | | | | | | |
| No.149 | ● | | | | | | | | | | | | | | | | | | | | | | | |
| No.150 | ● | | | | | | | | | | | | | | | | | | | | | | | |
| No.151 | ● | | | | | | | | | | | | | | | | | | | | | | | |
| No.152 | ● | | | | | ① | ② | | | | | | | | | | | | | | | | | |
| No.153 | ① | | | | | | ● | | | | | | | | | | | | | | | | | |
| No.154 | ● | | | | | | | | | | | | | | | | | | | | | | | |
| No.155 | ①● | | | | ② | ③ | | | | | | | | | | | | | | | | | | |
| No.156 | ①② | | | | ③ | | | | | | | | | | | | | | | | | | | ● |
| No.157 | ① | | | | ② | | | | | | | ● | | | | | | | | | | | | |
| No.158 | ①③● | ② | | ④ | | | | | | | | | | | | | | | | | | | | |
| No.159 | ● | | | | | | | | | | | | | | | | | | | | | | | |
| No.160 | ● | | | | | | | | | | | | | | | | | | | | | | | |

FIG. 3A

| LARVAE | \multicolumn{24}{c|}{PROJECTION LIGHT (PEAK WAVELENGTH: 562 – 582 nm)} |
| | \multicolumn{24}{c|}{IRRADIANCE: 100 W m$^{-2}$} |
| | \multicolumn{24}{c|}{LANES} |

| LARVAE | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| No.1 | ● | | | | | | | | | | | | | | | | | | | | | | | |
| No.2 | ● | | | | | | | | | | | | | | | | | | | | | | | |
| No.3 | ● | | | | | | | | | | | | | | | | | | | | | | | |
| No.4 | ● | | | | | | | | | | | | | | | | | | | | | | | |
| No.5 | ● | | | | | | | | | | | | | | | | | | | | | | | |
| No.6 | ● | | | | | | | | | | | | | | | | | | | | | | | |
| No.7 | ● | | | | | | | | ① | | | | | | | | | | | | | | | |
| No.8 | ● | | | | | | | | | | | | | | | | | | | | | | | |
| No.9 | ● | | | | | | | | | | ① | | | | | | | | | | | | | |
| No.10 | ● | | | | | | | | | | | | | | | | | | | | | | | |
| No.11 | ① | ● | | | | | | | | | | | | | | | | | | | | | | |
| No.12 | ● | | | | | | | | | | | | | | | | | | | | | | | |
| No.13 | ● | | | | | | | | | | | | | | | | | | | | | | | |
| No.14 | ● | | | | | | | | | | | | | | | | | | | | | | | |
| No.15 | ● | | | | | | | | | | | | | | | | | | | | | | | |
| No.16 | ● | | | | | | | ① | | | | | | | | | | | | | | | | |
| No.17 | ● | | | | | | | | | | | | | | | | | | | | | | | |
| No.18 | ● | | | | | | | | | | | | | | | | | | | | | | | |
| No.19 | ● | | | | | | | | | | | | | | | | | | | | | | | |
| No.20 | ● | | | | | | | | | | | | | | | | | | | | | | | |
| No.21 | ● | | | | | | | | | | | | | | | | | | | | | | | |
| No.22 | ● | | | | | | | | | | ① | | | | | | | | | | | | | |
| No.23 | ● | | | | | | | | | | | | | | | | | | | | | | | |
| No.24 | ● | | | | | | | | | | | | | | | | | | | | | | | |
| No.25 | ● | | | | | | | | | | | | | | | | | | | | | | | |
| No.26 | ● | | | | | | | | | | | | | | | | | | | | | | | |
| No.27 | ● | | | | | | | | | | | | | | | | | | | | | | | |
| No.28 | ● | | | | | | | | | | | | | | | | | | | | | | | |
| No.29 | ● | | | | | | | | | | | | | | | | | | | | | | | |
| No.30 | ● | | | | | | | | | | | | | | | | | | | | | | | |

FIG. 3B

| LARVAE | LANES | | | | | | | | | | | | | | | | | | | | | | | |
|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |

LED SPECTRUM: 515 – 535 nm
IRRADIANCE: 100 W m$^{-2}$

| Larvae | Result |
|---|---|
| No.31 | ●← lane 1 |
| No.32 | ●← lane 1 |
| No.33 | ●← lane 1 |
| No.34 | ●← lane 1 |
| No.35 | ●← lane 1 |
| No.36 | ●← lane 1 |
| No.37 | ●← lane 1 |
| No.38 | ●← lane 1 |
| No.39 | ●← lane 1 |
| No.40 | ●← lane 1 |
| No.41 | ●← lane 1 |
| No.42 | ●← lane 7 |
| No.43 | ●← lane 5 |
| No.44 | ①---→● lane 4 |
| No.45 | ①→● lane 2 |
| No.46 | ●← lane 1 |
| No.47 | ●← lane 1 |
| No.48 | ●← lane 1 |
| No.49 | ●← lane 1 |
| No.50 | ●← lane 1 |
| No.51 | ●← lane 1 |
| No.52 | ●← lane 1 |
| No.53 | ●← lane 1 |
| No.54 | ●← lane 1 |
| No.55 | ●← lane 1 |
| No.56 | ●← lane 1 |
| No.57 | ●← lane 1 |
| No.58 | ●← lane 1 |
| No.59 | ●← lane 1 |
| No.60 | ●← lane 1 |

FIG. 3C

| LARVAE | LED SPECTRUM: 460 – 480 nm ||||||||||||||||||||||||
|---|---|---|---|---|---|---|---|---|---|---|---|---|---|---|---|---|---|---|---|---|---|---|---|---|
| | IRRADIANCE: 100 W m$^{-2}$ ||||||||||||||||||||||||
| | LANES ||||||||||||||||||||||||
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| No.61 | | | | | | ● | | | | | | | | | | | | | | | | | | |
| No.62 | | | | | | ● | | | | | | | | | | | | | | | | | | |
| No.63 | | | | | ● | | | | | | | | | | | | | | | | | | | |
| No.64 | | ● | | | | | | | | | | | | | | | | | | | | | | |
| No.65 | ● | | | | | | | | | | | | | | | | | | | | | | | |
| No.66 | ● | | | | | | | | | | | | | | | | | | | | | | | |
| No.67 | ● | | | | | | | | | | | | | | | | | | | | | | | |
| No.68 | ● | | | | | | | | | | | | | | | | | | | | | | | |
| No.69 | ● | | | | | | | | | | | | | | | | | | | | | | | |
| No.70 | ● | | | | | | | | | | | | | | | | | | | | | | | |
| No.71 | ● | | | | | | | | | | | | | | | | | | | | | | | |
| No.72 | ● | | | | | | | | | | | | | | | | | | | | | | | |
| No.73 | ● | | | | | | | | | | | | | | | | | | | | | | | |
| No.74 | ● | | | | | | | | | | | | | | | | | | | | | | | |
| No.75 | ● | | | | | | | | | | | | | | | | | | | | | | | |
| No.76 | ● | | | | | | | | | | | | | | | | | | | | | | | |
| No.77 | ● | | | | | | | | | | | | | | | | | | | | | | | |
| No.78 | ● | | | | | | | | | | | | | | | | | | | | | | | |
| No.79 | ● | | | | | | | | | | | | | | | | | | | | | | | |
| No.80 | ● | | | | | | | | | | | | | | | | | | | | | | | |
| No.81 | ● | | | | | | | | | | | | | | | | | | | | | | | |
| No.82 | ● | | | | | | | | | | | | | | | | | | | | | | | |
| No.83 | ● | | | | | | | | | | | | | | | | | | | | | | | |
| No.84 | ● | | | | | | | | | | | | | | | | | | | | | | | |
| No.85 | ● | | | | | | | | | | | | | | | | | | | | | | | |
| No.86 | ● | | | | | | | | | | | | | | | | | | | | | | | |
| No.87 | ● | | | | | | | | | | | | | | | | | | | | | | | |
| No.88 | ● | | | | | | | | | | | | | | | | | | | | | | | |
| No.89 | ● | | | | | | | | | | | | | | | | | | | | | | | |
| No.90 | ● | | | | | | | | | | | | | | | | | | | | | | | |

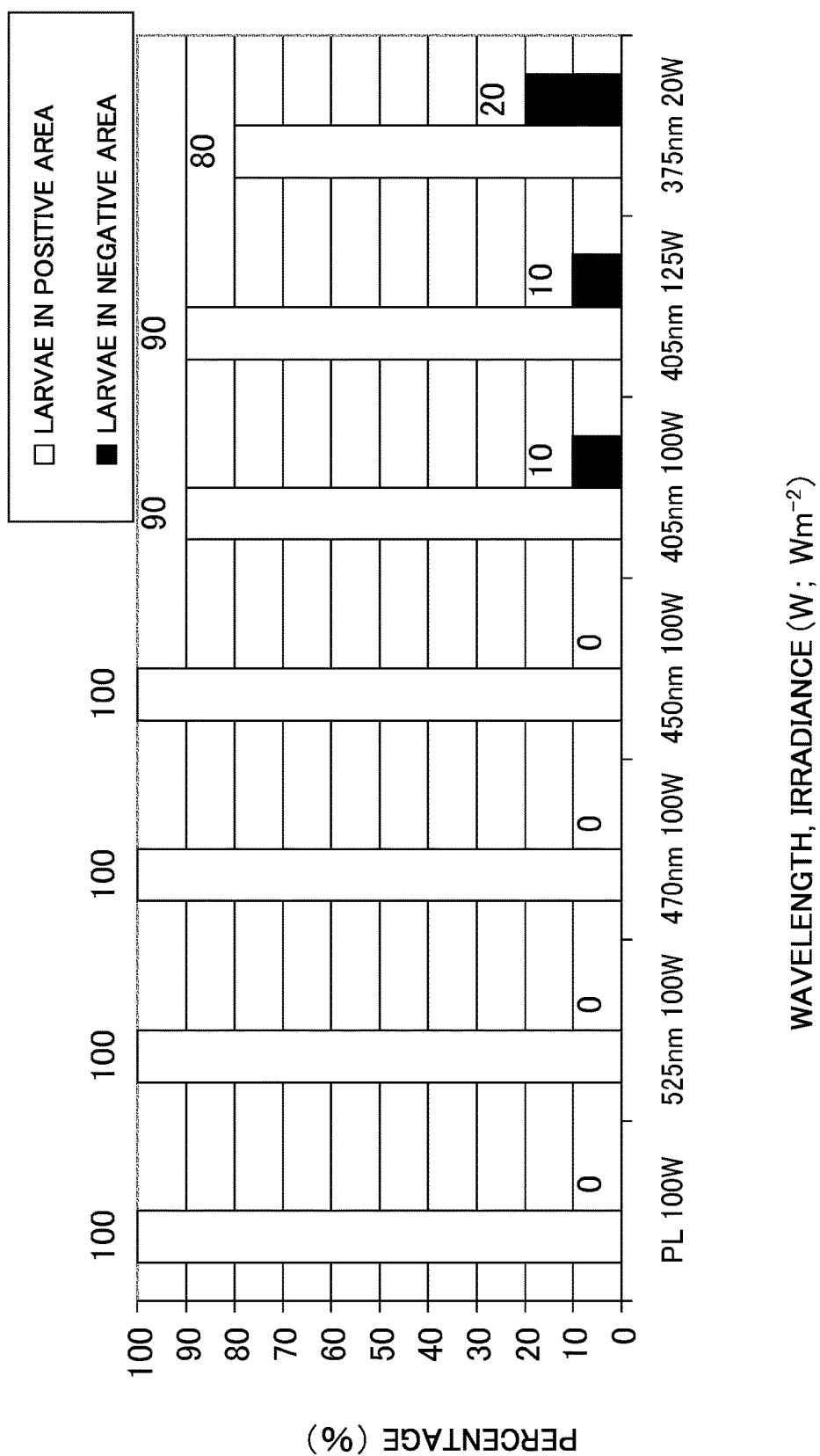

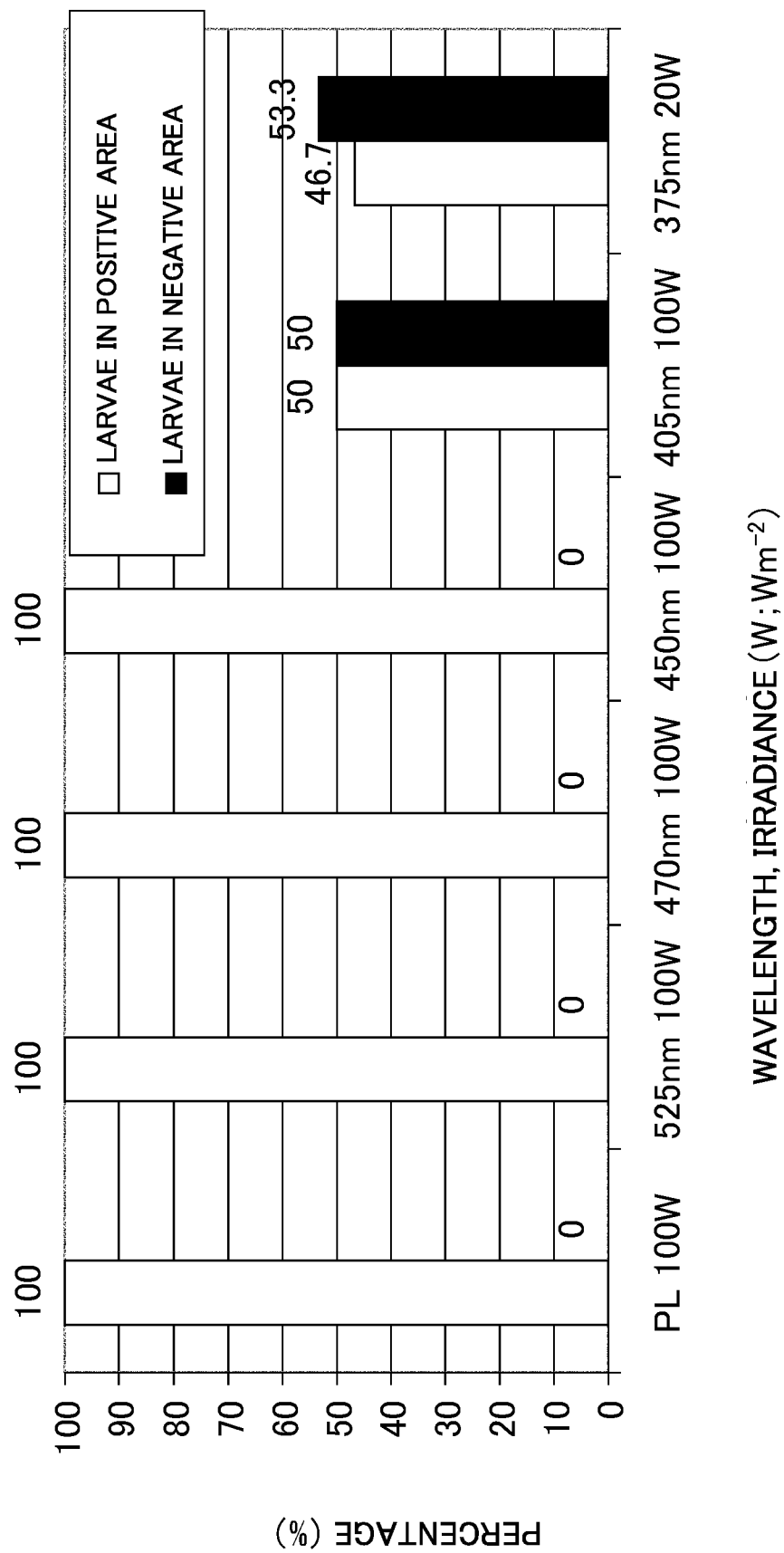

METHODS OF SUPPRESSING SETTLEMENT OF BARNACLES

TECHNICAL FIELD

The present invention relates to methods of suppressing larvae of barnacles in the settlement stage from settling on a substrate in water.

BACKGROUND ART

In power plants, such as thermal or nuclear power plants that use seawater as a coolant, marine invertebrates such as barnacles and shellfishes often settle inside of intake structures through which seawater is drawn from the sea and is supplied to condensers and outfall structures through which the seawater having passed through the condensers is discharged into the sea. An increased amount of settled marine invertebrates may possibly cause clogging of the coolant passages, resulting in a problem of, for example, the reduction in cooling capacity. Accordingly, the settlement of marine invertebrates on the heat exchanger pathways has been suppressed by injecting a chlorine-based substance such as a sodium hypochlorite solution or chlorine dioxide into the coolant (Japanese Patent Laid-open Nos. 7-265867, 11-37666, 2005-144212, 2005-144213, and 2005-144214, and Japanese Patent No. 3605128). Other methods have also been developed which use a photocatalyst (Japanese Patent Laid-open No. 11-278374) or a laser beam (Japanese Patent Laid-open Nos. 2003-301435, 06-218367, and 08-164384).

SUMMARY OF THE INVENTION

Problem to be Solved by the Invention

An object of the present invention is to provide methods of suppressing larvae of barnacles in the settlement stage from settling on a substrate in water.

Means to Solve the Problem

Although many larvae in the settlement stage exhibit positive phototaxis towards light in a wide range of wavelengths, the present inventors have found that the irradiation of light comprising the full spectrum of 409 to 412 nm tends to cause a drastic decrease of the percentage of larvae moving towards a light source and an increase of the number of larvae that exhibit negative phototaxis moving away from the light source. The present invention was thus completed.

One aspect of the present invention is a method of suppressing a larva of a barnacle in a settlement stage from settling on a substrate in water, including the step of irradiating light comprising the spectrum of 409 to 412 nm and a part of 400 to 460 nm in a direction from the substrate to the larva in the settlement stage. It is preferable that the light comprising the spectrum of a part of 400 to 440 nm. It is preferable that the light has a peak wavelength in the range between 409 nm and 412 nm. It is preferable that the light comprises a full spectrum of 400 to 420 nm. It is preferable that the light has an irradiance of 67.78 W/m$^2$ or higher. It is preferable that a spectral irradiance of the light is 62.9282 μWcm$^{-2}$ nm$^{-1}$ or higher in at least a part or full range of 409 to 412 nm. It is preferable that the light is not a laser beam. The larvae in the settlement stage may be a cypris larva. The water may be seawater. The light may be LED light.

BRIEF DESCRIPTION OF THE DRAWINGS

FIG. 2A is a graphical representation showing the directions of movement and positions of cypris larvae of *Megabalanus rosa* when light with a peak wavelength of 562 to 582 nm (from a projection light) was irradiated;

FIG. 2B is a graphical representation showing the directions of movement and positions of cypris larvae of *Megabalanus rosa* when LED light with a peak wavelength of 515 to 535 nm was irradiated;

FIG. 2C is a graphical representation showing the directions of movement and positions of cypris larvae of *Megabalanus rosa* when LED light with a peak wavelength of 460 to 480 nm was irradiated;

FIG. 2D is a graphical representation showing the directions of movement and positions of cypris larvae of *Megabalanus rosa* when LED light with a peak wavelength of 440 to 460 nm was irradiated;

FIG. 2E is a graphical representation showing the directions of movement and positions of cypris larvae of *Megabalanus rosa* when LED light with 100 W/m$^2$ and a peak wavelength of 409 to 412 nm was irradiated;

FIG. 2F is a graphical representation showing the directions of movement and positions of cypris larvae of *Megabalanus rosa* when LED light with 125 W/m$^2$ and a peak wavelength of 409 to 412 nm was irradiated;

FIG. 2G is a graphical representation showing the directions of movement and positions of cypris larvae of *Megabalanus rosa* when LED light with a peak wavelength of 370 to 380 nm was irradiated;

FIG. 3A is a graphical representation showing the directions of movement and positions of cypris larvae of *Balanus amphitrite* when light with a peak wavelength of 562 to 582 nm (from a projection light) was irradiated;

FIG. 3B is a graphical representation showing the directions of movement and positions of cypris larvae of *Balanus amphitrite* when LED light with a peak wavelength of 515 to 535 nm was irradiated;

FIG. 3C is a graphical representation showing the directions of movement and positions of cypris larvae of *Balanus amphitrite* when LED light with a peak wavelength of 460 to 480 nm was irradiated;

FIG. 4C is a graphical representation showing the directions and distances of movement of cypris larvae of

Figure 4A:
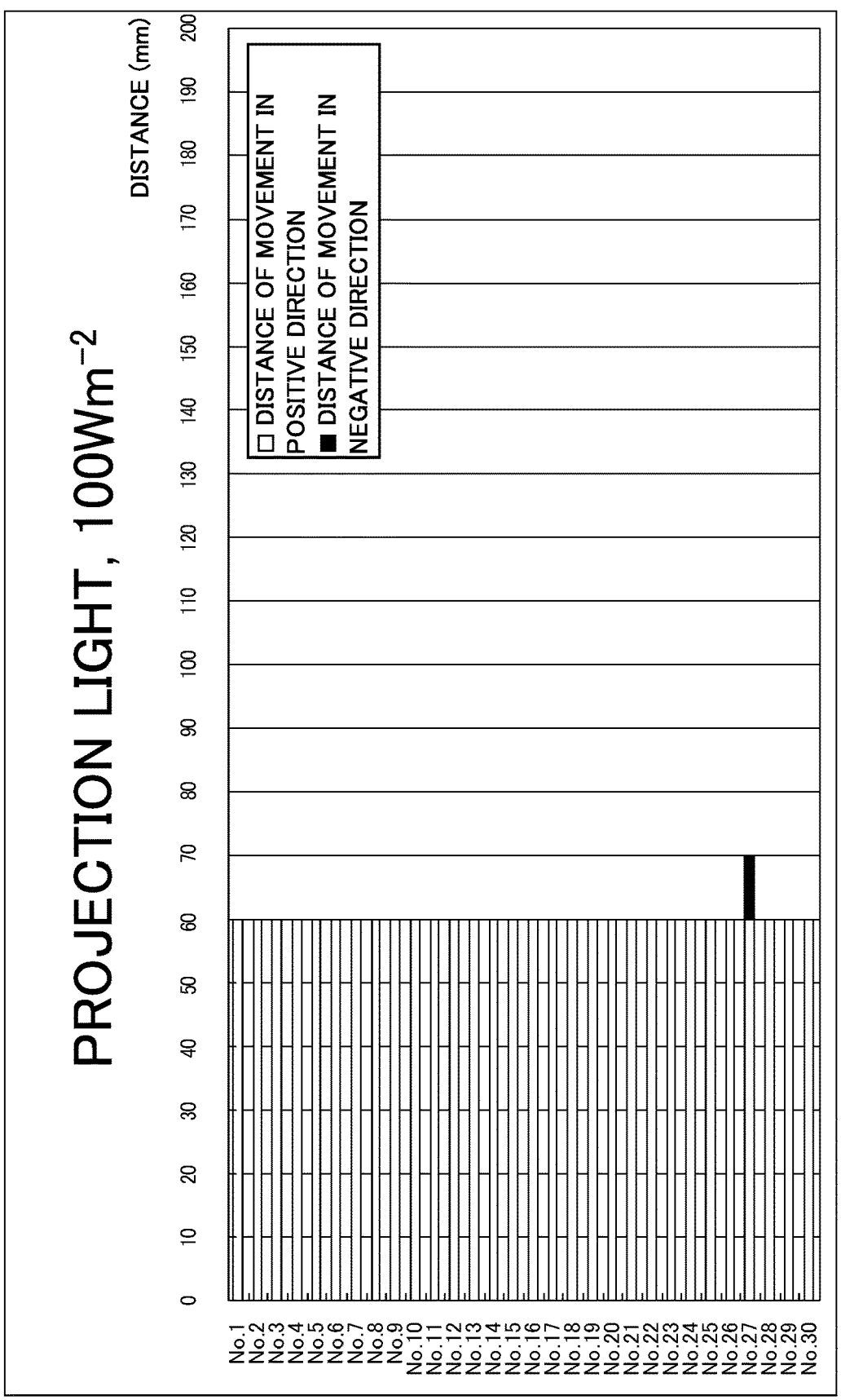
FIG. 4A is a graphical representation showing the directions and distances of movement of cypris larvae of *Megabalanus rosa* when light with a peak wavelength of 562 to 582 nm (from a projection light) was irradiated.
Figure 4B:
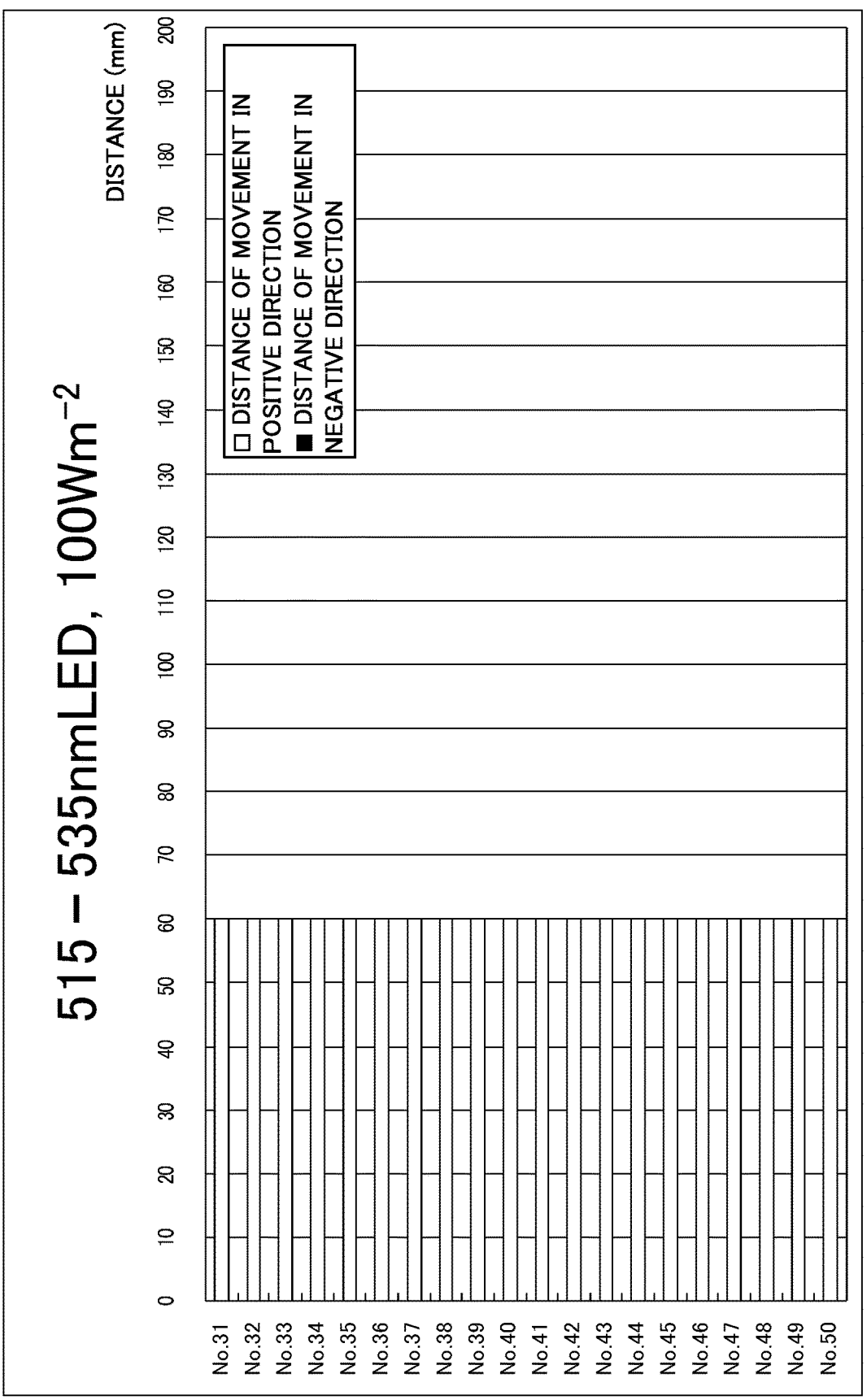
FIG. 4B is a graphical representation showing the directions and distances of movement of cypris larvae of *Megabalanus rosa* when LED light with a peak wavelength of 515 to 535 nm was irradiated.
Figure 4C:
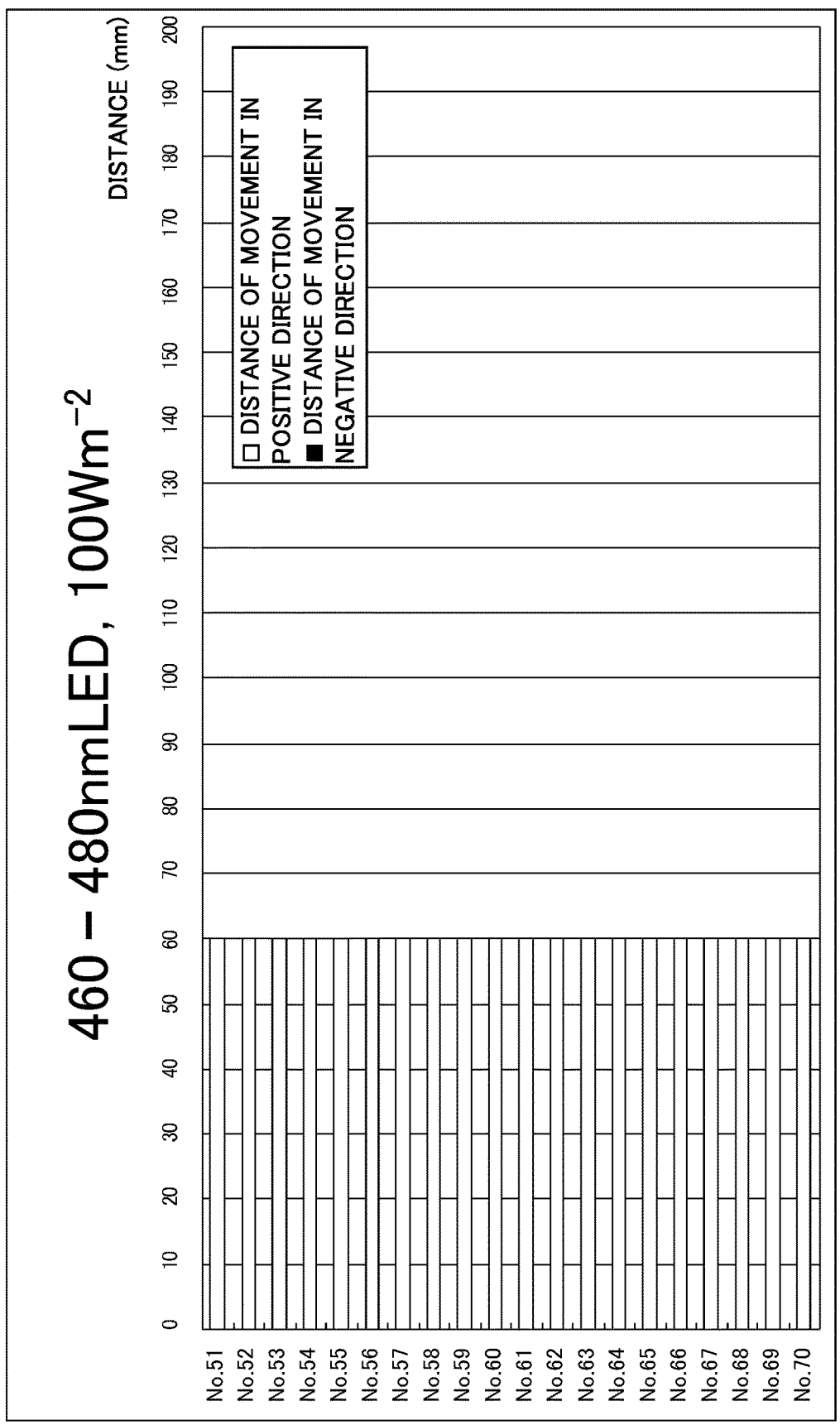
Figure 4D:
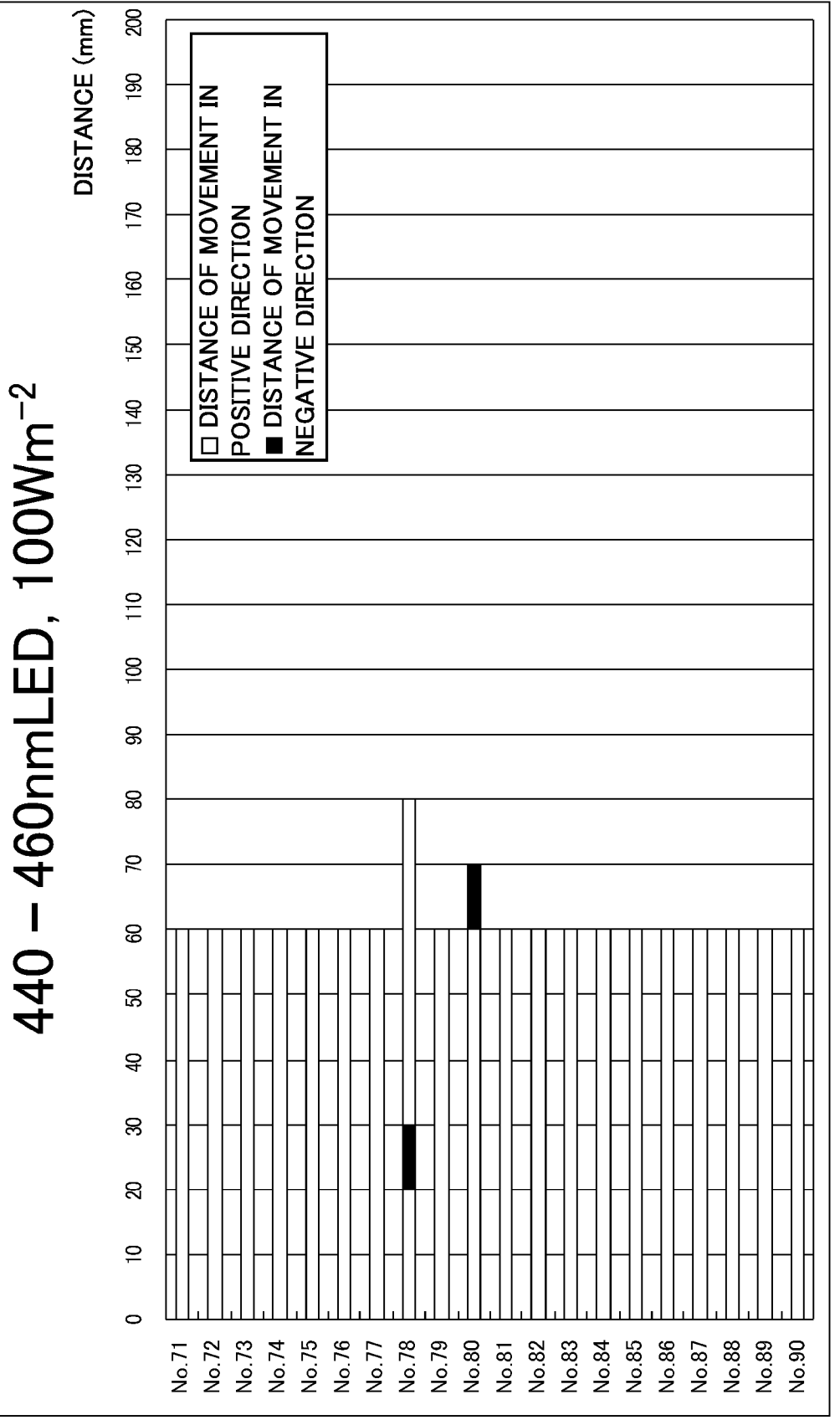
Figure 4E:
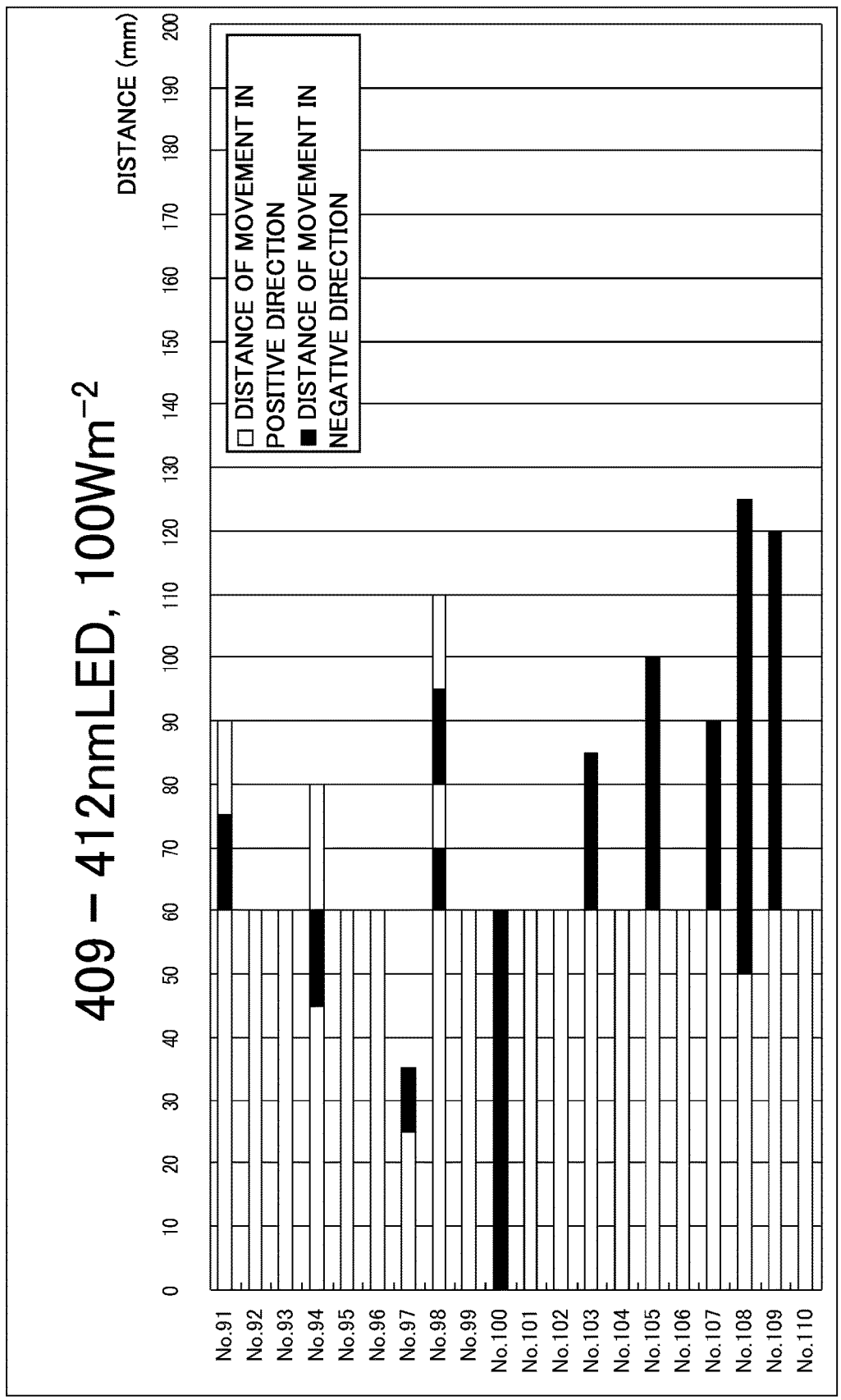
Figure 4F:
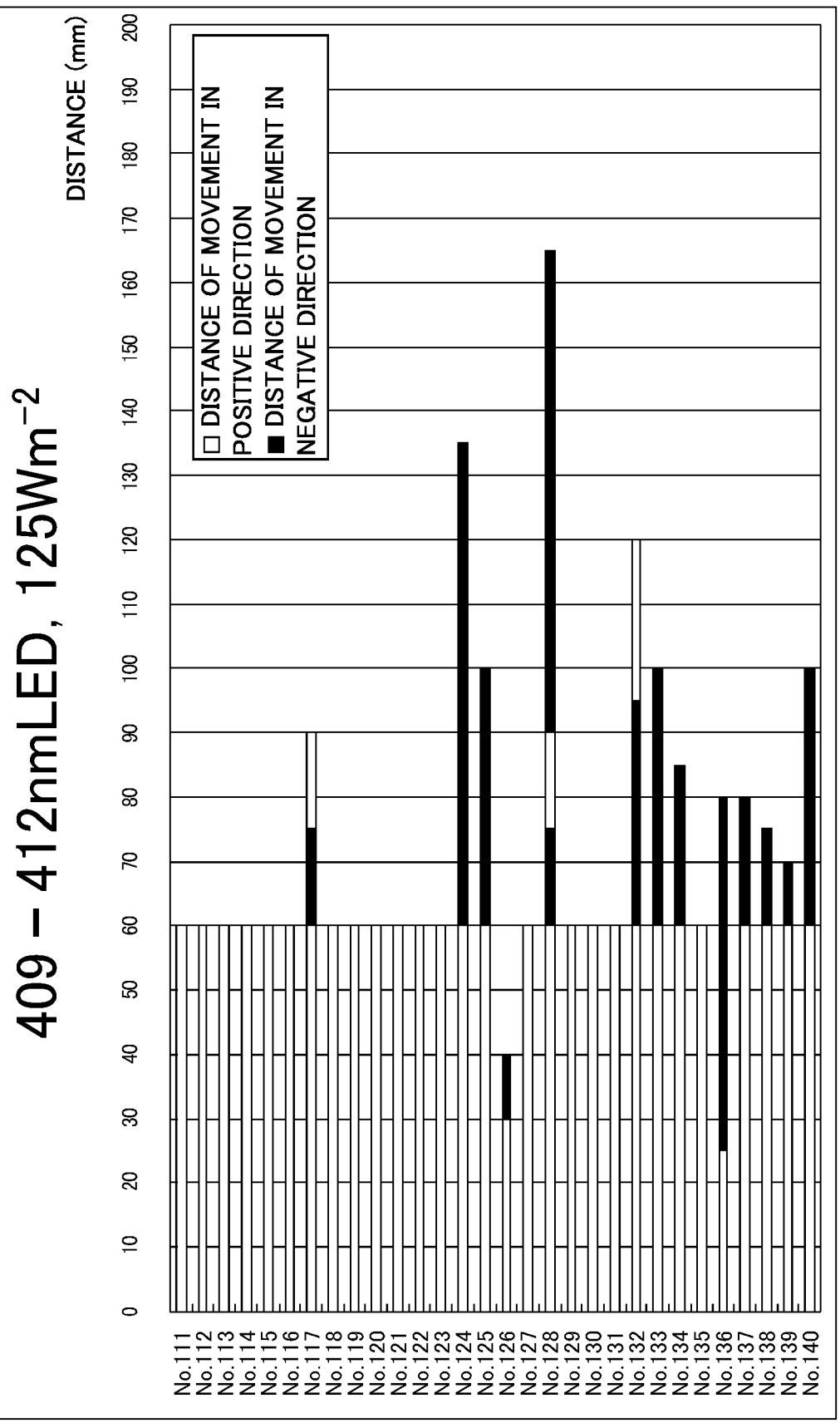
Figure 4G:
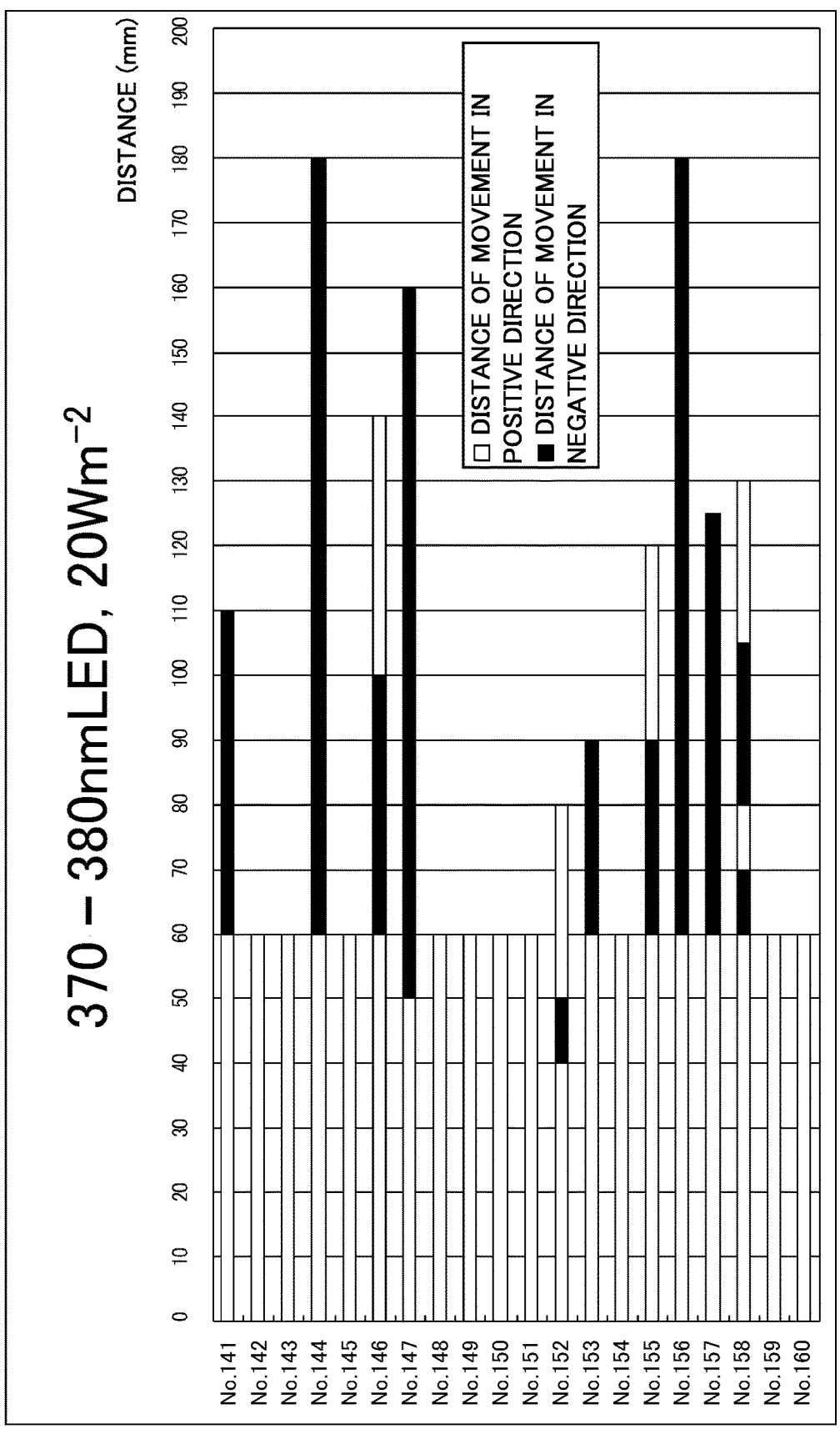
Figure 5A:
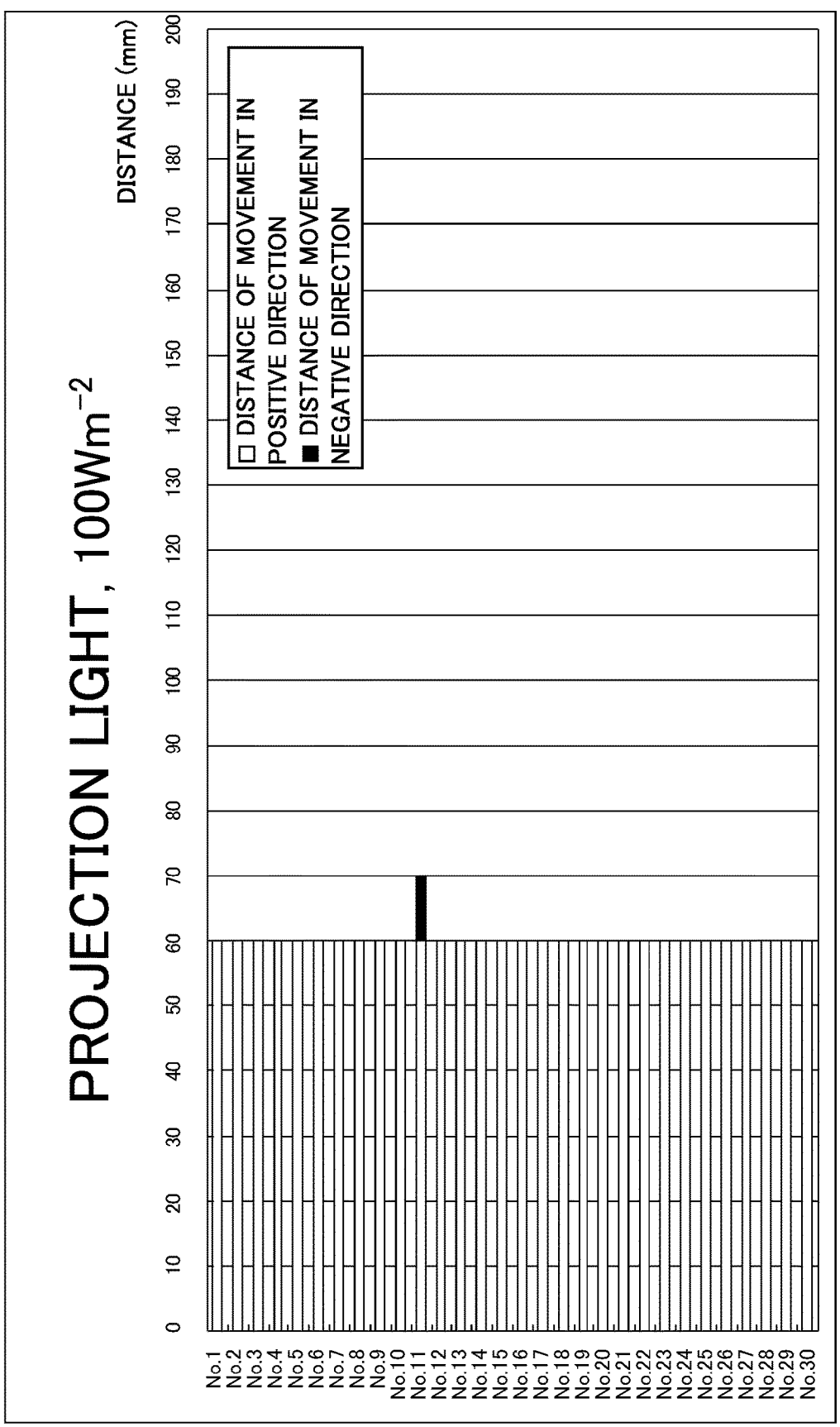
Figure 5B:
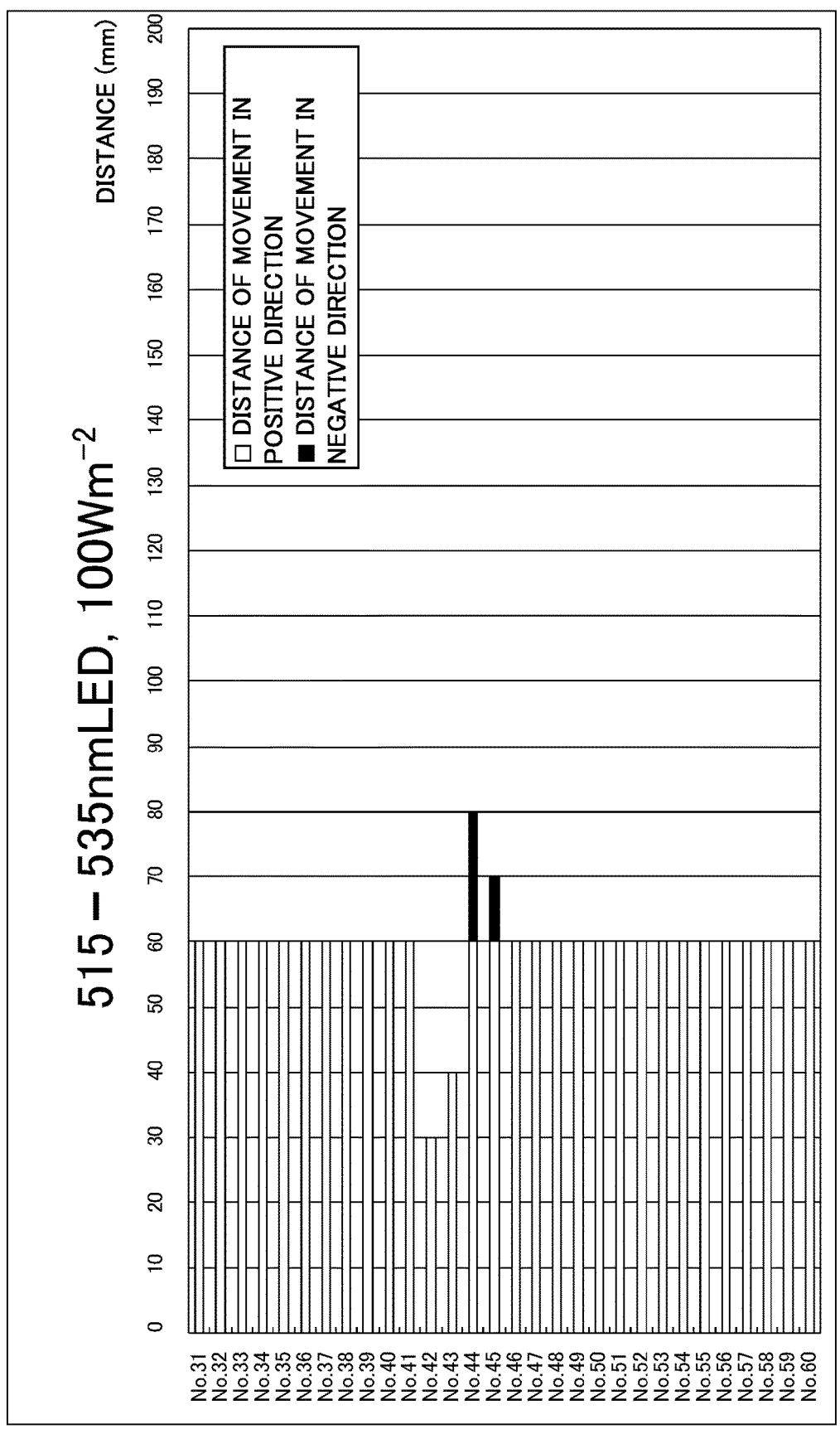
Figure 5C:
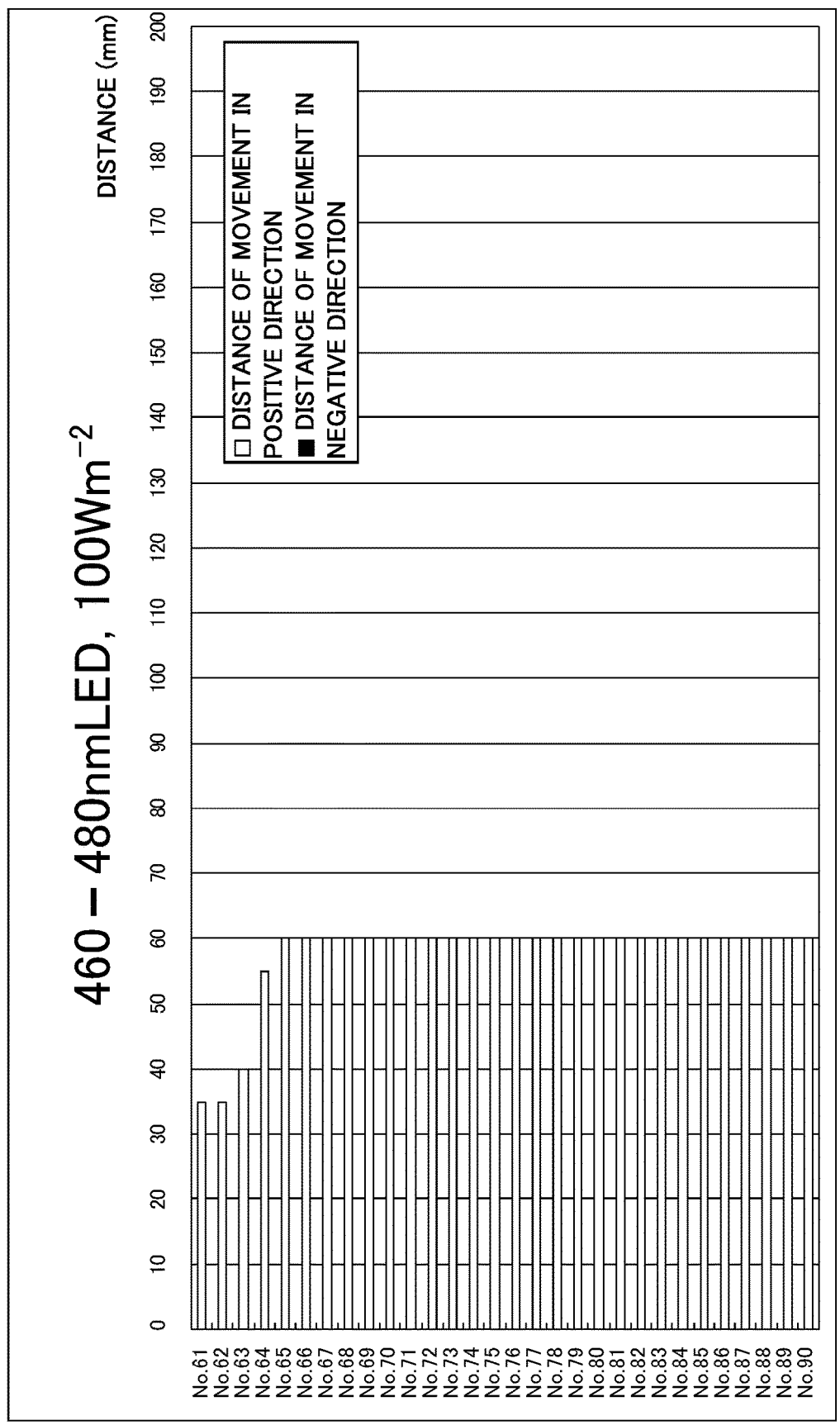
Figure 5D:
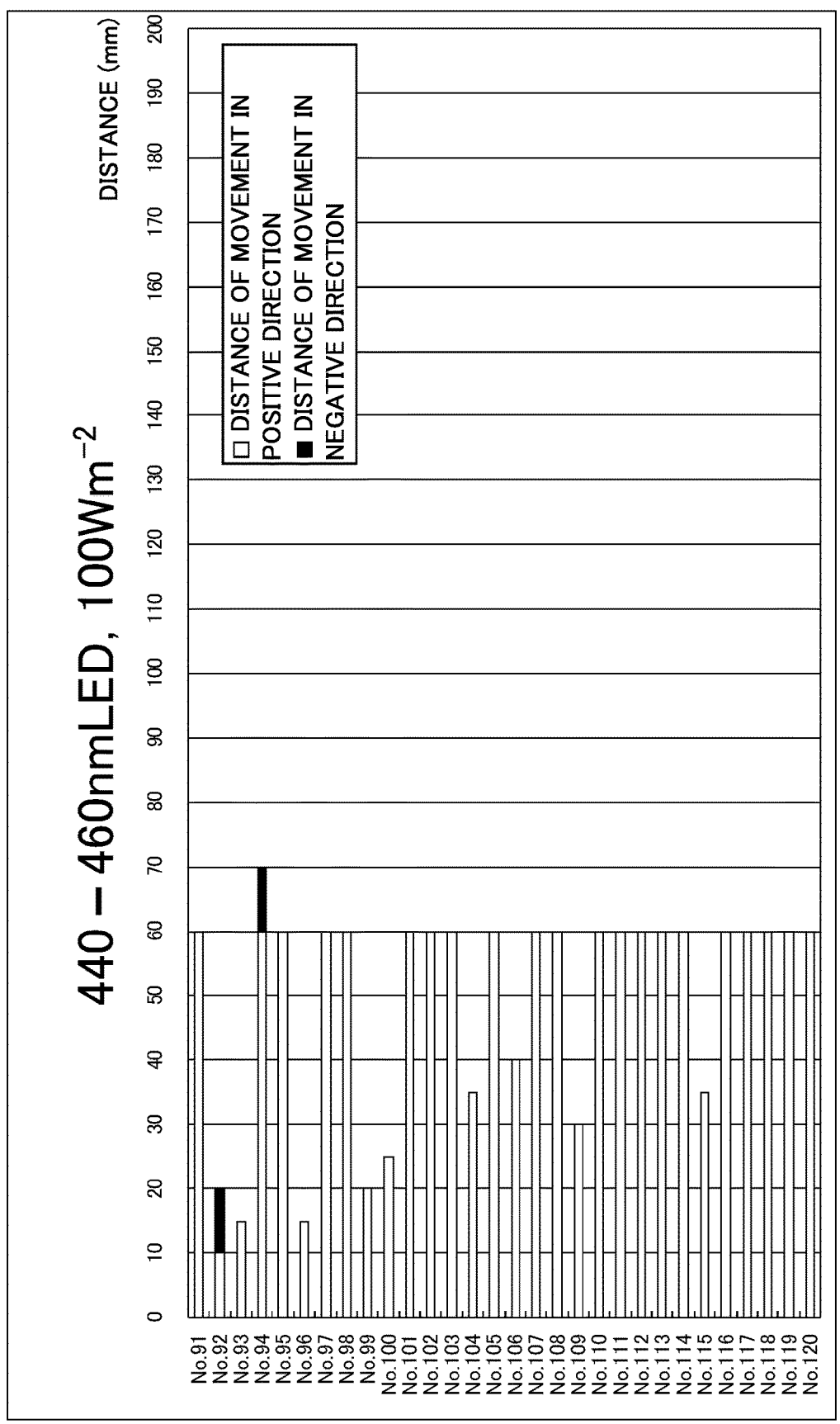
Figure 5E:
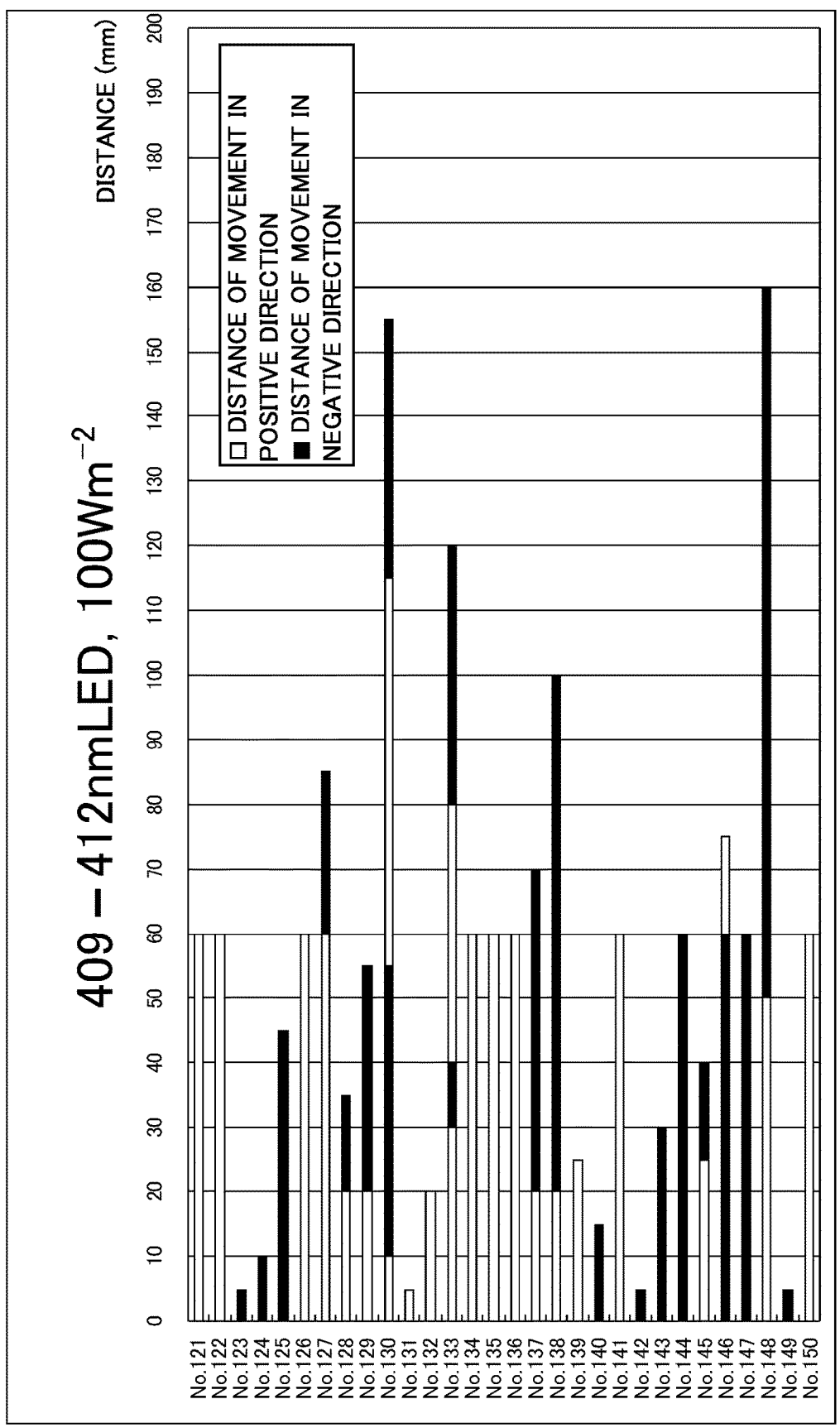
Figure 5F:
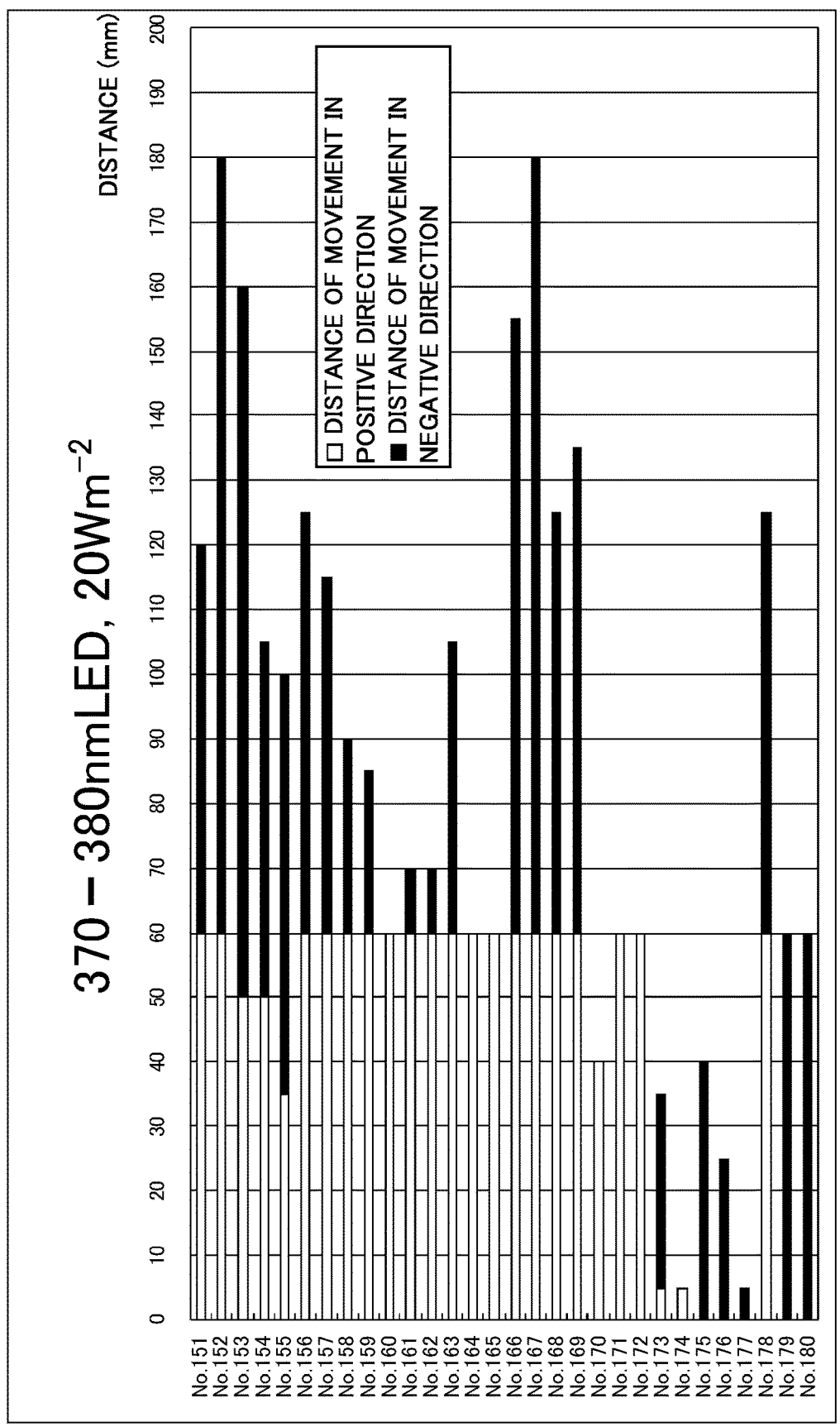

*Megabalanus rosa* when LED light with a peak wavelength of 460 to 480 nm was irradiated;

FIG. 4D is a graphical representation showing the directions and distances of movement of cypris larvae of *Megabalanus rosa* when LED light with a peak wavelength of 440 to 460 nm was irradiated;

FIG. 4E is a graphical representation showing the directions and distances of movement of cypris larvae of *Megabalanus rosa* when LED light with 100 W/m$^2$ and a peak wavelength of 409 to 412 nm was irradiated;

FIG. 4F is a graphical representation showing the directions and distances of movement of cypris larvae of *Megabalanus rosa* when LED light with 125 W/m$^2$ and a peak wavelength of 409 to 412 nm was irradiated;

FIG. 4G is a graphical representation showing the directions and distances of movement of cypris larvae of *Megabalanus rosa* when LED light with a peak wavelength of 370 to 380 nm was irradiated;

FIG. 5A is a graphical representation showing the directions and distances of movement of cypris larvae of *Balanus amphitrite* when light with a peak wavelength of 562 to 582 nm (from a projection light) was irradiated;

FIG. 5B is a graphical representation showing the directions and distances of movement of cypris larvae of *Balanus amphitrite* when light with a peak wavelength of 515 to 535 nm was irradiated;

FIG. 5C is a graphical representation showing the directions and distances of movement of cypris larvae of *Balanus amphitrite* when LED light with a peak wavelength of 460 to 480 nm was irradiated;

FIG. 5D is a graphical representation showing the directions and distances of movement of cypris larvae of *Balanus amphitrite* when LED light with a peak wavelength of 440 to 460 nm was irradiated;

FIG. 5E is a graphical representation showing the directions and light with a peak wavelength of 409 to 412 nm was irradiated;

FIG. 5F is a graphical representation showing the directions and distances of movement of cypris larvae of *Balanus amphitrite* when LED light with a peak wavelength of 370 to 380 nm was irradiated;

FIG. 6 is a graph showing the percentages of cypris larvae of *Megabalanus rosa* located in positive and negative areas when light with a peak wavelength of 562 to 582 nm (from a projection light), LED light with peak wavelengths of 370 to 380 nm, 409 to 412 nm, 440 to 460 nm, 460 to 480 nm, or 515 to 535 nm was irradiated for 5 minutes; and FIG. 7 is a graph showing the percentages of cypris larvae of *Balanus amphitrite* located in positive and negative areas when light with a peak wavelength of 562 to 582 nm (from a projection light), LED light with peak wavelengths of 370 to 380 nm, 409 to 412 nm, 440 to 460 nm, 460 to 480 nm, or 515 to 535 nm was irradiated for 10 minutes.

EMBODIMENT FOR CARRYING OUT THE INVENTION

The objects, features, advantages, and ideas of the present invention are apparent to those skilled in the art from the description of the present specification. Furthermore, those skilled in the art can easily reproduce the present invention from the description of the present specification. The mode and the specific example described below represent a preferable embodiment of the present invention, which is given for the purpose of illustration or description. The present invention is not limited thereto. It is obvious to those skilled in the art that various changes and modifications may be made according to the descriptions of the present specification without departing from the spirit and scope of the present invention disclosed herein.

Method of suppressing larvae of barnacles in the settlement stage from settling on a substrate in water according to the present invention include the step of irradiating light comprising the spectrum of 409 to 412 nm and a part of 400 to 460 nm to the larva in the settlement stage in a direction from the substrate to the larva in the settlement stage. By this method, the number of larvae exhibiting negative phototaxis of moving away from a light source is increased and settlement of larvae in the settlement stage on a substrate can be prevented.

Barnacles drift in the sea in their early larval stage and then settle on an appropriate substrate during the larval settlement stage to metamorphose into adults. Accordingly, the method of suppressing their larvae in the settlement stage from settling on a substrate is preferably performed in seawater, but is not limited to in the seawater. Instead, the method may be performed in freshwater or salt water with a concentration different from seawater, such as a mixture of freshwater and seawater.

Barnacle is a common name for invertebrates in the superorder Thoracica in the infraclass Cirripedia in the subphylum Crustacea and includes, for example, those in the suborder Balanomorpha, such as *Balanus amphitrite, Amphibalanus eburneus, Megabalanus rosa, Balanus trigonus* Darwin, *Megabalanus volcano, Amphibalanus reticulatus, Chthamalus challengeri* Hoek, *Fistulobalanus albicostatus*, and *Amphibalanus improvisus*.

For barnacles, larvae in the settlement stage correspond to cypris larvae. The substrate on which the larvae in the settlement stage settle is not particularly limited; examples include seawater intake and outfall systems in power plants, coastal aquaculture facilities or fishery facilities.

The light to the larvae in the settlement stage is irradiated in a direction from the substrate to the larvae in the settlement stage. The light is then irradiated from a position closer to the substrate from the position of the larvae in the settlement stage. The angle between the direction of light irradiation and the surface of the substrate is not specifically limited but an angle closer to the vertical is preferred and a nearly vertical angle or the vertical angle is mostly preferred. Accordingly, it is preferable that a light source is embedded into the substrate and the light is emitted from the substrate.

The light to be irradiated to larvae in the settlement stage comprises the spectrum of 409 to 412 nm and a part (the term "a part" is defined not to include "full") of 400 to 460 nm; that is, the light does not comprise the full spectrum of 400 to 460 nm. It is preferable that the light comprises the spectrum of 409 to 412 nm and a part (the term "a part" is intended not to include "full") of 400 to 440 nm; that is, the light does not comprise the full spectrum of 400 to 440 nm. The light may comprise only the full spectrum of 409 to 412 nm but preferably comprises the full spectrum of 400 to 420 nm. The light may comprise the spectrum of ultraviolet radiation (having wavelengths shorter than 400 nm), visible radiation (having wavelengths of 400 to 830 nm), or infrared radiation (having wavelengths longer than 830 nm), in addition to the full spectrum of 409 to 412 nm. Light with wavelengths in the range between 400 nm and 420 nm can be transmitted better through seawater than ultraviolet light. Accordingly, the present invention can exert effects of light on a larger area compared with methods using light in the ultraviolet range only. On the other hand, as shown in Examples, it is preferable that the light has a peak wavelength in the range between 409 nm and 412 nm. This light may not be necessarily a laser beam.

The intensity and time of the irradiation of the light are not specifically limited and can appropriately and easily be determined by those skilled in the art depending on the environment to be irradiated (e.g., quality, depth, and clarity of the water). The irradiance is preferably 67.78 W/m² or higher, more preferably 80 W/m² or higher, and most preferably 100 W/m² or higher. Furthermore, in a part or full range of 409 to 412 nm, the spectral irradiance is preferably 62.9282 µWcm$^{-2}$ nm$^{-1}$ or higher, more preferably 75.5043 µWcm$^{-2}$ nm$^{-1}$ or higher, and most preferably 82.1088 µWcm$^{-2}$ nm$^{-1}$ or higher. The irradiation of light to the larvae in the settlement stage may be continuous or intermittent. When the irradiation is made continuously, the total time of irradiation is preferably 5 minutes or longer, more preferably 10 minutes or longer, and most preferably 15 minutes or longer.

The irradiation method is not particularly limited. For example, devices such as an LED emitter, a mercury lamp, and a fluorescent tube can be used as the irradiator. An LED emitter is preferred and optical fibers using LEDs are particularly preferable.

EXAMPLES

==Phototaxis Assay Chamber==

In the phototaxis assay, a phototaxis assay chamber with inner dimensions of 12 cm (length) by 5 cm (width) by 4 cm (depth) was used. A lower half of the surface of one short side is made of a silica glass plate (5 mm in thickness, 2 cm in height, and 5 cm in width) and only this part is transparent to light. An LED panel used as a light source was arranged outside the chamber in such a manner that LED light can be directed from the outside into the inside of the chamber through the silica glass plate.

Figure 1:
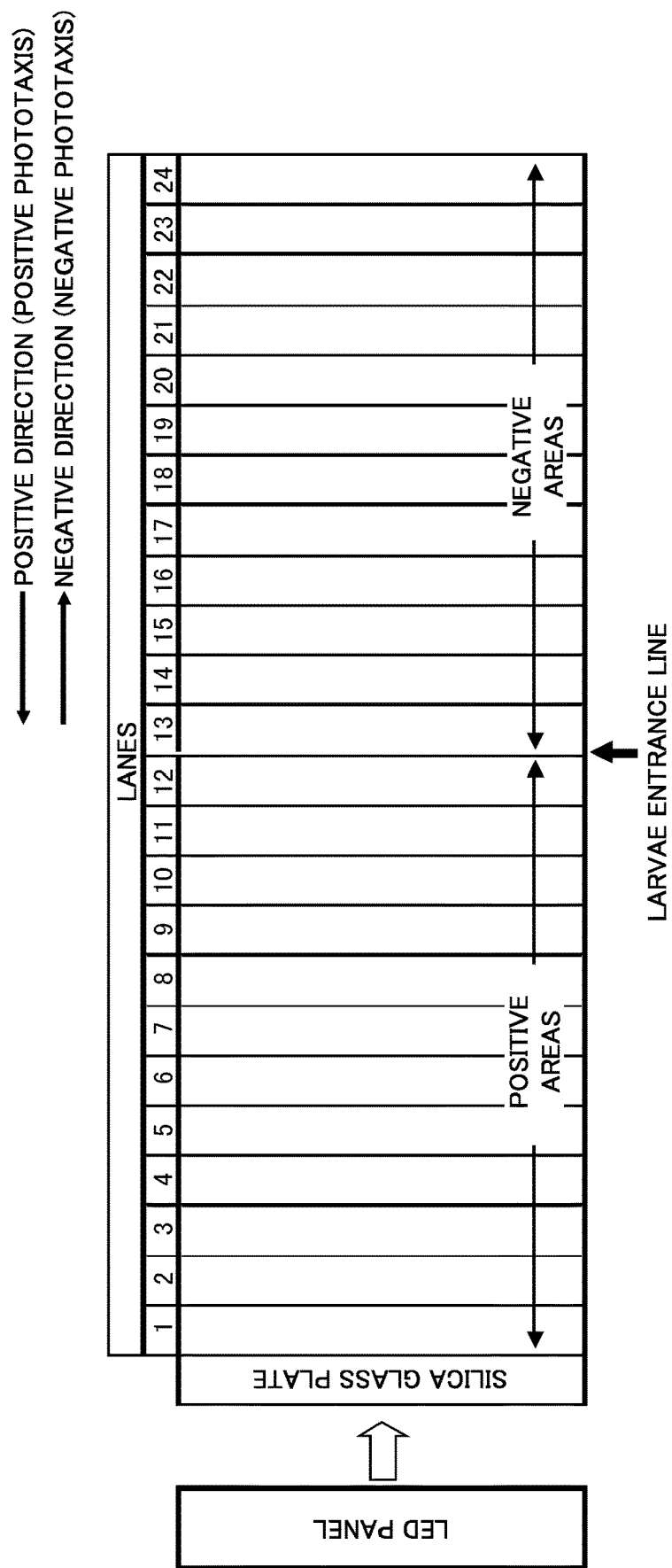
FIG. 1 is a schematic diagram of a bottom of a phototaxis assay chamber which is divided into multiple areas, used in Examples.
Figure 3D:
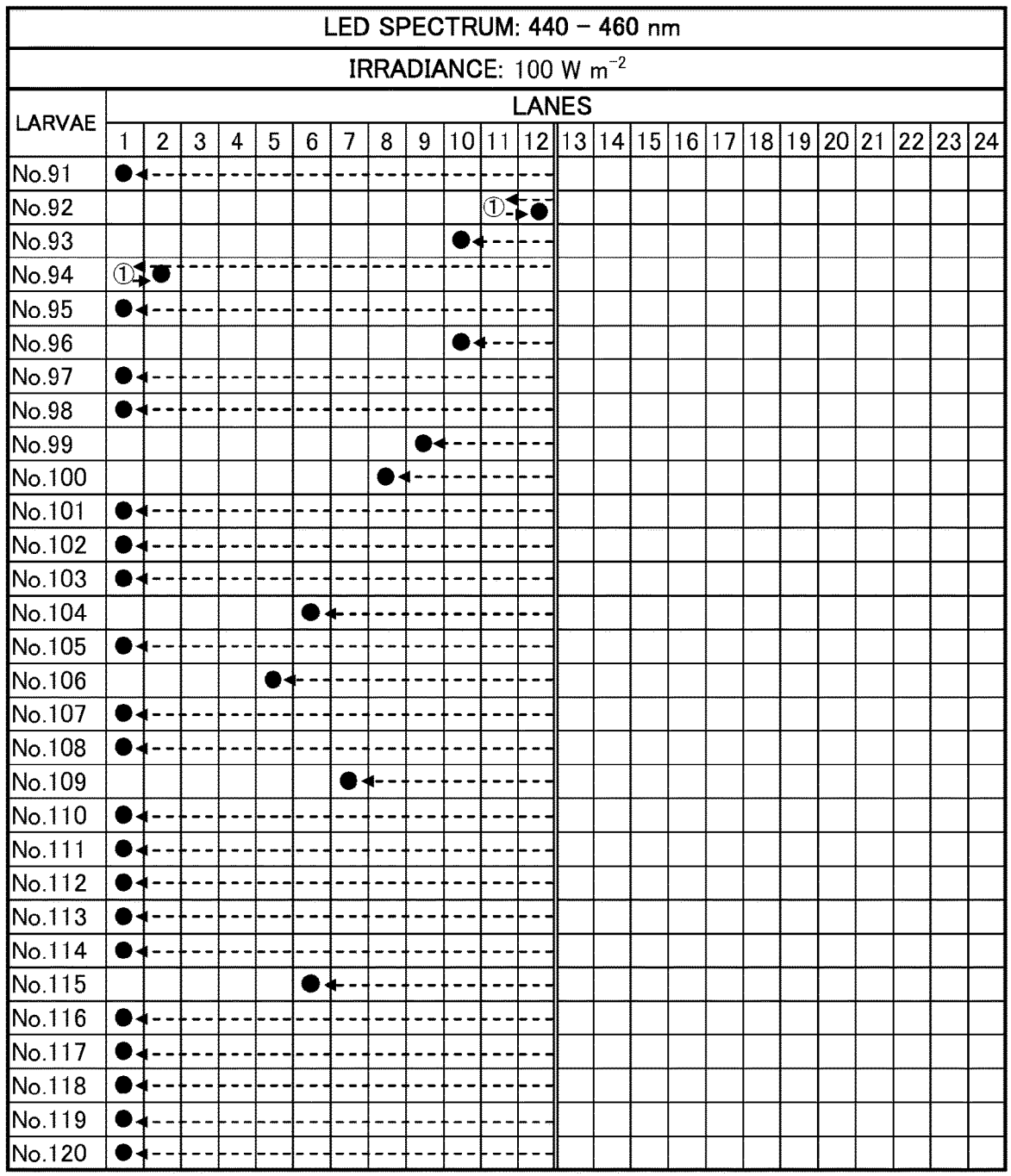
FIG. 3D is a graphical representation showing the directions of movement and positions of cypris larvae of *Balanus amphitrite* when LED light with a peak wavelength of 440 to 460 nm was irradiated.
Figure 3E:
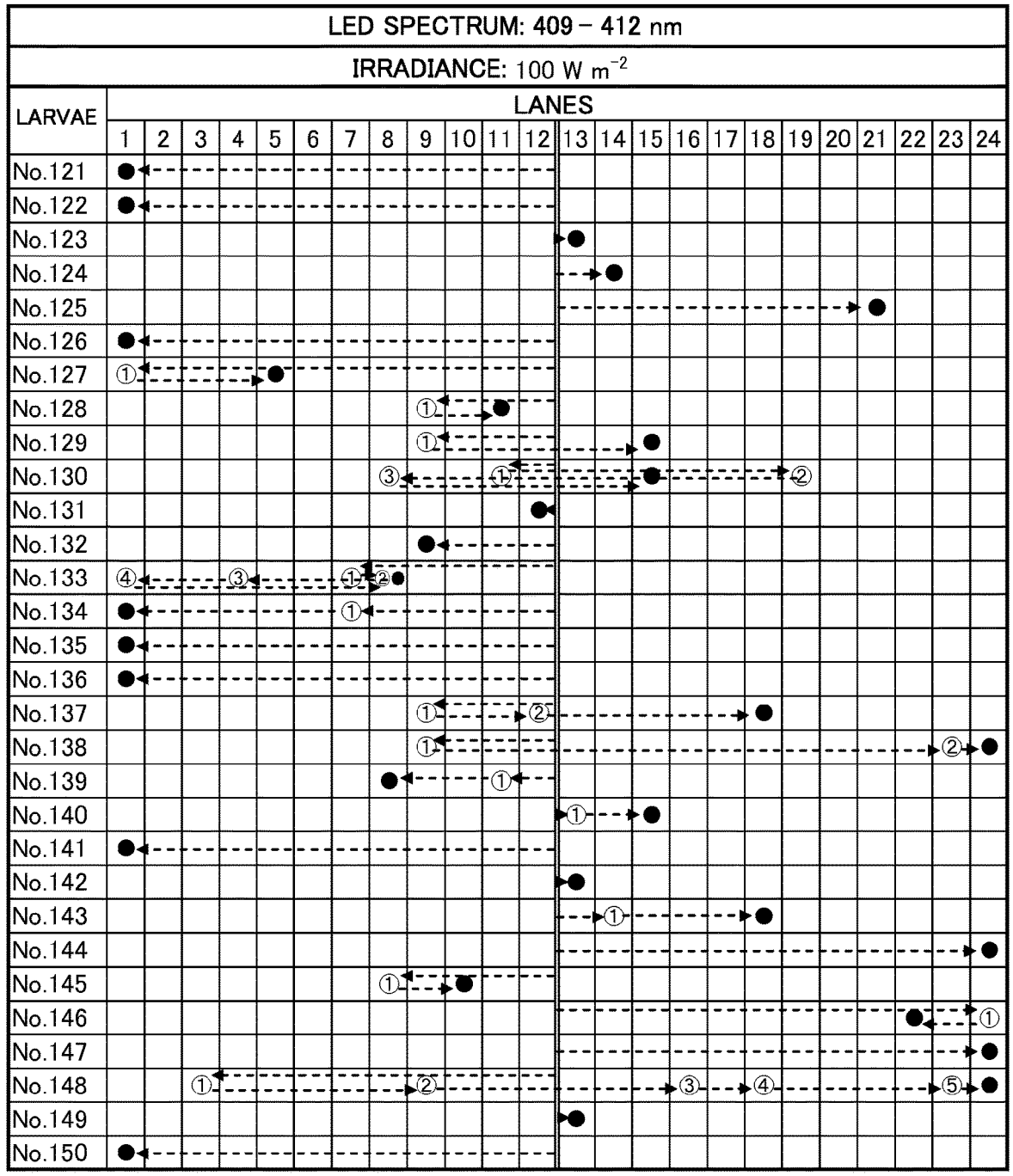
FIG. 3E is a graphical representation showing the directions of movement and positions of cypris larvae of *Balanus amphitrite* when LED light with a peak wavelength of 409 to 412 nm was irradiated.
Figure 3F:
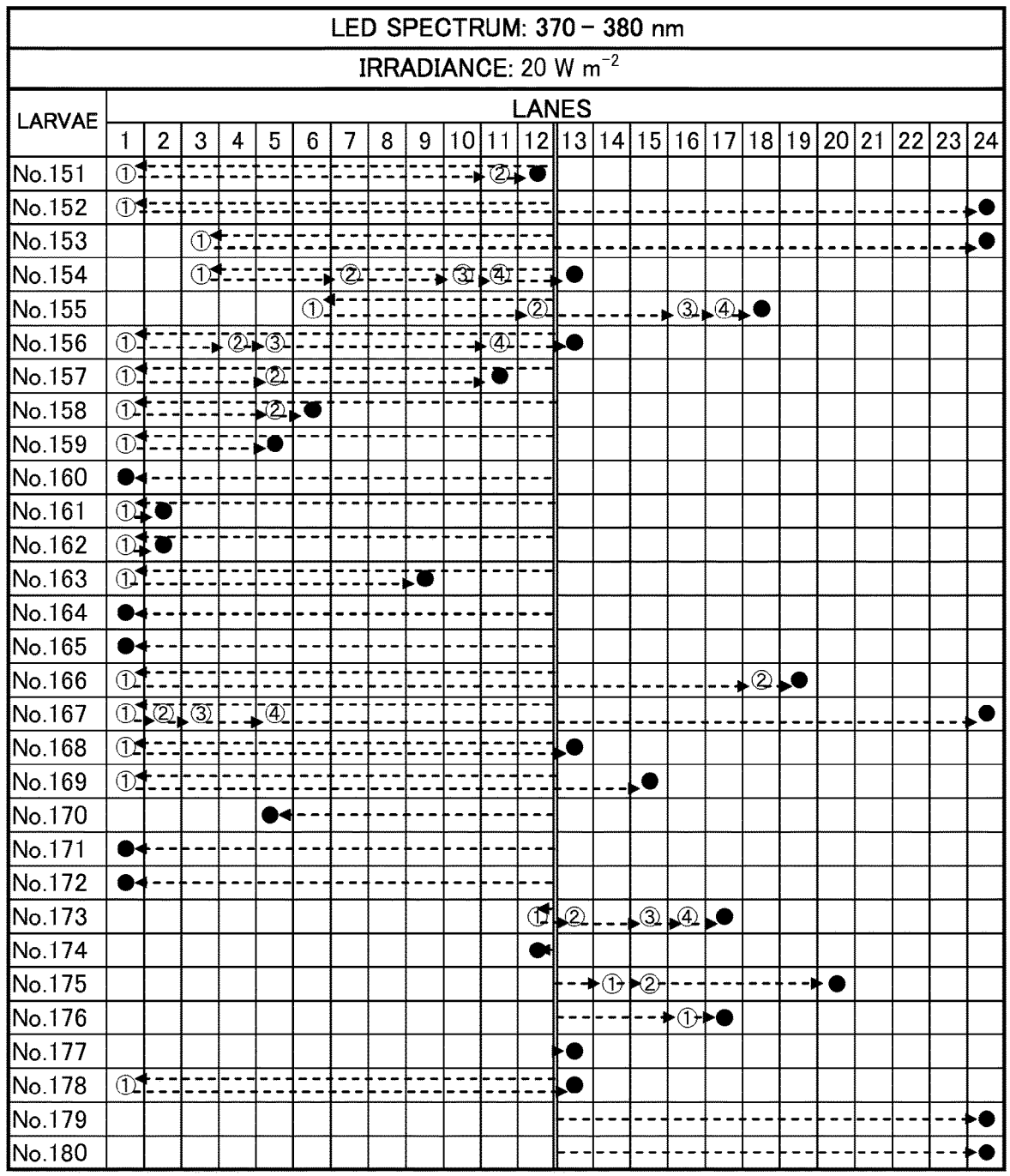
FIG. 3F is a graphical representation showing the directions of movement and positions of cypris larvae of *Balanus amphitrite* when LED light with a peak wavelength of 370 to 380 nm was irradiated.

The bottom surface of the phototaxis assay chamber was divided into 5-mm-wide areas by drawing lines every 5 mm from the silica glass plate and denoted as the 1st to the 24th areas from the area closest to the silica glass plate, as shown in FIG. 1. The direction of movement towards the silica glass in the chamber was defined as a "positive direction (positive phototaxis)" and the direction away from the silica glass was defined as a "negative direction (negative phototaxis)." The 1st to 12th areas were defined as "positive areas" and the 13th to 24th areas were defined as "negative areas." The line between the 12th and 13th areas was used as a "larvae entrance line" from which larvae are entered. The "larvae entrance line" is away from 6 cm from the surface of the silica glass plate.

==LED Panel==

In the phototaxis assay, a projection light (Olympus LG-PS2) with peak wavelengths of 562 to 582 nm, an LED panel (LED panel model: ISL-150X150UU375TPNL manufactured by CSS Inc.) with LED light-emitting elements with peak wavelengths of 370-380 nm, an LED panel (LED panel model: ISL-150X150-VV-TPNL manufactured by CSS Inc.) with LED light-emitting elements with peak wavelengths of 409-412 nm, an LED panel (LED panel model: ISL-150X150BB45-TPNL manufactured by CSS Inc.) with LED light-emitting elements with peak wavelengths of 440-460 nm, an LED panel (LED panel model: ISL-150X150-BB-TPNL manufactured by CSS Inc.) with LED light-emitting elements with peak wavelengths of 460-480 nm, and an LED panel (LED panel model: ISL-150X150-GG-TPNL manufactured by CSS Inc.) with LED light-emitting elements with peak wavelengths of 515-535 nm were used. Wavelength characteristics of each LED light are given in Table 1.

TABLE 1

Wavelength characteristics of each LED light used for phototaxis assay

| | Peak wavelength (nm) | | | | |
|---|---|---|---|---|---|
| | 370-380 | 409-412 | 440-446 | 460-480 | 515-535 |
| Half power angle (°) | ±45 | ±65 | ±55 | ±55 | ±55 |
| Half width (nm) | 15 | 15 | 20 | 25 | 40 |

Assays were performed with the irradiance of the LED light set at 20 W/m² for the irradiation of light with a peak wavelength of 370 to 380 nm and at 100 W/m² for the irradiation of light with other peak wavelength. For cypris larvae of *Megabalanus rosa*, the assay was performed also using LED light with a peak wavelength of 409 to 412 nm and an irradiance of 125 W/m². The irradiance was measured and adjusted, at a position 0 cm away from the surface of the silica glass plate, for the light emitted from the LED panel arranged outside the phototaxis assay chamber and directed into the phototaxis assay chamber through the silica glass plate. The irradiance was measured using radiation sensors Pyranometer LI-200 (400-1100 nm) and UV-AB sensor SD204AB-Cos (UV-AB8) manufactured by MEI-WAFOSIS Co., Ltd. The irradiance and photon flux density of each LED light is given in Table 2.

TABLE 2

Irradiance, illuminance, and photon flux density of each LED light used in phototaxis assay

| | Peak wavelength (nm) | | | | | |
|---|---|---|---|---|---|---|
| | 370-380 | 409-412 | 409-412 | 440-446 | 460-480 | 515-535 |
| Irradiance (W/m²) | 20 | 100 | 125 | 100 | 100 | 100 |
| Illuminance (1x) | — | 485 | 702 | 3931 | 6407 | 59494 |
| Photon flux density (µmols$^{-1}$m$^{-2}$) | — | 836 | 1089 | 754 | 762 | 603 |

A peak spectral irradiance measured at the position 0 cm away from the surface of the silica glass plate using a spectroradiometer (MSR-7000N manufactured by Opto Research Corporation) was 82.1088 µWcm$^{-2}$ nm$^{-1}$ when the irradiance of the light of 409 to 412 nm at the position 0 cm away from the surface of the silica glass plate was set to 100 W/m². A peak spectral irradiance measured at the position 0 cm away from the surface of the silica glass plate using a spectroradiometer (MSR-7000N manufactured by Opto Research Corporation) was 90.3643 µWcm$^{-2}$ nm$^{-1}$ when the irradiance of the light of 409 to 412 nm at the position 0 cm away from the surface of the silica glass plate was set to 125 W/m².

The irradiance and peak spectral irradiance at a position 6 cm away from the surface of the silica glass plate (i.e., on the larvae entrance line) were calculated when the irradiance at the position 0 cm away from the surface of the silica glass plate was set to 100 W/m². First, photon flux densities were measured using a sensor (Quantum sensor LI-192SA manufactured by MEIWAFOSIS Co., Ltd.) and peak spectral irradiances were measured using a spectroradiometer (MSR- 7000N manufactured by Opto Research Corporation) in seawater at the positions 0 cm and 6 cm away from the surface of the silica glass plate when the irradiance at the position 0 cm away from the surface of the silica glass plate was set to 88.51 W/m². The irradiances were then calculated from the measured photon flux densities using an equation: irradiance=0.112884×photon flux density+0.051842. Attenuations of the irradiance and the peak spectral irradiance were then calculated to be 67.78% and 76.64%, respectively. Accordingly, when the irradiance at the position 0 cm away from the surface of the silica glass plate was set to 100 W/m² (the peak spectral irradiance was set to 82.1088 μWcm⁻² nm⁻¹), the irradiance on the larvae entrance line (i.e., 6 cm away from the surface of the silica glass plate) was 67.78 W/m² from the equation (100 Wm⁻²× 0.6778=67.78 Wm⁻²) and the peak spectral irradiance on the larvae entrance line was 62.9282 μWcm⁻² nm⁻¹ from the equation (82.1088 μWcm⁻² nm⁻¹×0.7664=62.9282 μWcm⁻² nm⁻¹).

==Selection of Cypris Larvae==

Light with the irradiance of 100 W/m² emitted from a projection light (Olympus LG-PS2) was irradiated to cypris larvae, which are larvae in the settlement stage, of *Megabalanus rosa*, a sessile invertebrate, for at least 1 hour until immediately before experiments, and larvae that exhibited approaching behavior to the light source were used for the following experiment.

Cypris larvae, which are larvae in the settlement stage, of *Balanus amphitrite* were selected in a similar manner and used for the following experiments.

==Larvae Observation Method==

A darkroom (test room) that was made completely dark was prepared using a black-out curtain at a part of a room and the following experiments were performed within this darkroom.

One to five larva(e) was/were placed on the larvae entrance line in a phototaxis assay chamber containing seawater (water temperature: 23.1° C., salt concentration: 29.5 PSU, pH 8.4) (water depth of 2 cm) filtered through a 3-μm-mesh membrane filter (ADVANTEC) and then LED light was irradiated to cypris larvae of *Megabalanus rosa* and *Balanus amphitrite* for 5 and 10 minutes, respectively. During the irradiation of the light, the larvae were observed from the upside of the chamber to record the direction of movement and the position of each larva. Results obtained with the cypris larvae of *Megabalanus rosa* and *Balanus amphitrite* are given in FIGS. 2A to 2G and FIGS. 3A to 3F, respectively. In FIGS. 2A to 2G and FIGS. 3A to 3F, each black circle represents the position of the larva at the time of stopping the irradiation of the LED light and each encircled number in the figures represents the position at which the larva was temporarily stopped and the order in which the larva was stopped. Next, the distance that each larva moved was calculated from the observation results. FIGS. 4A to 4G show the direction and distance of movement of the cypris larvae of *Megabalanus rosa* and FIG. 5A to 5F show the direction and distance of movement of the cypris larvae of *Balanus amphitrite*.

The white and black bars in FIGS. 4A to 4G and 5A to 5F represent the distance of movement in the positive and negative directions, respectively. The percentages of the larvae located in the areas in the positive or negative direction at the time of stopping the irradiation of the light are shown in FIG. 6 for the cypris larvae of *Megabalanus rosa* and in FIG. 7 for the cypris larvae of *Balanus amphitrite*.

==Results==

The cypris larvae of both *Megabalanus rosa* and *Balanus amphitrite* exhibited strong positive phototaxis to the light with the peak wavelength of 562 to 582 nm from the projection light and light with the peak wavelengths of 460 to 480 nm and 515 to 535 nm (FIGS. 2A to 2C, 3A to 3C, 4A to 4C, 5A to 5C, 6, and 7). On the contrary, when the light with the peak wavelength of 440 to 460 nm was irradiated, the number of larvae moved to lane 1 was decreased and some larvae temporarily moved in the negative direction (FIGS. 2D, 3D, 4D, 5D, 6, and 7). Furthermore, when the light with the peak wavelength of 409 to 412 nm was irradiated, the number of larvae moving to lane 1 was decreased further whereas the number of larvae moving in the negative direction was increased (FIGS. 2E, 2F, 3E, 4E, 4F, 5E, 6, and 7).

When the light with the wavelength 370 to 380 nm was irradiated, the number of larvae moving in the negative direction was increased (FIGS. 2G, 3F, 4G, 5F, 6, and 7). Considering, however, that the light with wavelengths in the range between 400 nm and 420 nm has a higher transmittance in the seawater than the ultraviolet light (having wavelengths shorter than 400 nm), it is particularly effective to irradiate the light comprising a violet spectrum and having a peak in the wavelength range between 409 nm and 412 nm rather than using the light only with the ultraviolet spectrum in order to suppress the larvae of barnacles in the settlement stage from settling on a substrate in water over a wide region.

Furthermore, some cypris larvae of both *Megabalanus rosa* and *Balanus amphitrite* were observed to move, to the negative direction, from the position of the larvae entrance line where the light with the peak wavelength of 409 to 412 nm has an irradiance of 67.78 W/m² and a peak spectral irradiance of 62.9282 μWcm⁻² nm⁻¹ (FIGS. 2E, 3E, 4E, and 5E). Thus, it is effective to use the irradiance of 67.78 W/m² or higher and the peak spectral irradiance of 62.9282 μWcm⁻² nm⁻¹ or higher at the substrate for the larvae of barnacles in the settlement stage to settle on a substrate.

INDUSTRIAL APPLICABILITY

The present invention made it possible to provide methods of suppressing larvae of barnacles in the settlement stage from settling on a substrate in water.

The invention claimed is:

1. A method of suppressing a larva of a barnacle in a settlement stage from settling on a substrate in water, comprising a step of irradiating light consisting of a part of a spectrum of 400 nm to 440 nm to the larva in the settlement stage in a direction from the substrate to the larva in the settlement stage, wherein the light irradiating the larva in the settlement stage has a peak wavelength in a range between 409 nm and 412 nm.

2. The method according to claim 1, wherein the part of the spectrum consists of a spectrum of 400 nm to 420 nm.

3. The method according to claim 2, wherein the light is not a laser beam.

4. The method according to claim 1, wherein an irradiance of the light is 67.78 W/m² or higher.

5. The method according to claim 4, wherein the light is not a laser beam.

6. The method according to claim 1, wherein a spectral irradiance of the light is 62.9282 μWcm⁻²nm⁻¹ or higher in at least a part or full range of 409 to 412 nm.

7. The method according to claim 6, wherein the light is not a laser beam.

8. The method according to claim 1, wherein the light is not a laser beam.

9. The method according to claim 1, wherein the larva in the settlement stage is a cypris larva.

10. The method according to claim 9, wherein the light is not a laser beam.

11. The method according to claim 1, wherein the water is seawater.

12. The method according to claim 11, wherein the light is not a laser beam.

13. The method according to claim 1, wherein the light is LED light.

14. The method according to claim 13, wherein the light is not a laser beam.

15. The method according to claim 1, wherein the part of the spectrum consists of a part of a spectrum of 400 nm to 420 nm.

\* \* \* \* \*